(12) United States Patent
Cho et al.

(10) Patent No.: US 7,084,231 B2
(45) Date of Patent: Aug. 1, 2006

(54) POLYARYLENE COMPOUNDS, POLYMERS THEREOF, AND ELECTROLUMINESCENCE ELEMENT USING THE SAME

(75) Inventors: Hyun-Nam Cho, Seoul (KR); Sung Hyun Jung, Seoul (KR); Seok Jin Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 38 days.

(21) Appl. No.: 10/819,142

(22) Filed: Apr. 7, 2004

(65) Prior Publication Data
US 2005/0176915 A1    Aug. 11, 2005

(30) Foreign Application Priority Data
Apr. 22, 2003    (KR)    ........................ 10-2003-0025469

(51) Int. Cl.
 C08G 61/00    (2006.01)
 C08G 61/10    (2006.01)
 C08G 61/12    (2006.01)
(52) U.S. Cl. .................. 528/86; 528/373; 428/690; 428/917; 313/503; 313/504
(58) Field of Classification Search .............. 528/86, 528/373; 428/690, 917; 313/503, 504
 See application file for complete search history.

(56) References Cited

U.S. PATENT DOCUMENTS

| 2,890,207 A | 6/1959 | Kraiman et al. |
|---|---|---|
| 2,971,944 A | 2/1961 | Chow et al. |
| 4,400,540 A | 8/1983 | Reinhardt et al. |
| 5,621,131 A | 4/1997 | Kreuder et al. |
| 5,708,130 A | 1/1998 | Woo et al. |
| 5,807,974 A | 9/1998 | Kim et al. |
| 5,876,864 A | 3/1999 | Kim et al. |
| 5,882,829 A | 3/1999 | Hsieh et al. |
| 5,900,327 A | 5/1999 | Pei et al. |
| 5,965,679 A | 10/1999 | Godschalx et al. |

FOREIGN PATENT DOCUMENTS

JP        3-46814        2/1991

OTHER PUBLICATIONS

Gerrit Klarner, et al., "Colorfast Blue-Light Emitting Random Copolymers Derived from Di-n-hexylfluorene and Anthracene," Communications, Adv. Mater., 1998, 10, No. 13.

Hubert Spreitzer, et al., "Soluble Phenyl-Substituted PPVs—New Materials for High Efficient Polymer LEDs," Adv. Mater. 1998, 10, No. 16.

Mark T. Bernius, et al., "Progress with Light-Emitting Polymers," Adv. Mater., 2000, 12, No. 23.

(Continued)

*Primary Examiner*—Duc Truong
(74) *Attorney, Agent, or Firm*—Dickstein, Shapiro, Morin & Oshinsky, LLP.

(57) ABSTRACT

Disclosed are a polyarylene compound and polymers thereof, which can be used as core materials for an organic or polymeric electro-luminescence (EL) element or for other optical devices, a preparation method thereof, and an EL element using the same.

15 Claims, 3 Drawing Sheets

OTHER PUBLICATIONS

James M. Tour, "Soluble Oligo-and Polyphenylenes," Adv. Maters. 1994, 6, No. 3, pp. 190-198.

Hyun Nam Cho, et al., "Blue and Green Light Emission from New Soluble Alternating Copolymers," Adv. Mater. 1997, 9, No. 4, pp. 326-328.

Arno Kraft, et al., "Electroluminescent Conjugated Polymers—Seeing Polymers in a New Light," Angew. che. Int. Ed. 1998, 37, pp. 402-428.

Andrew P. Davey, "New Rigid Backbone Conjugated Organic Polymers with Large Fluorescence Quantum," J. Chem. Soc., Communic., 1995, pp. 1433-1434.

M. Moroni, et al., "Rigid Rod Conjugated Polymers for Nonlinear Optics. 1. Characterization and Linear Optical Properties of Poly(arleneethynylene) Derivatives," Macromolecules 1994, 27, pp. 562-571.

M.R. Andersson, et al., "Electroluminescense from Substituted Poly(thiophenes): From Blue to Near-Infrared," Macromolecules 1995, 28, pp. 7525-7529.

Kevin A. Bunten, et al., "Synthesis, Optical Absorption, Fluorescence, Quantum Efficiency, and Electrical Conductivity Studies of Pyridine/Pyridinium Dialkynyl Organic and PT(ll)-0-Acetylide Monomers and Polymers," Macromolecules 1996, 29, pp. 2885-2893.

C. Weder, et al., Efficient Solid-State Photoluminescence in New Poly(2,5-dialkoxy-p-phenylennethynylene)s, American Chemical Society, 1996, pp. 29, pp. 5157-5165.

H.N. Cho, et al., "Statistical Copolymers for Blue-Light-Emitting Diodes," Macromolecules 1999, 32, pp. 1476-1481.

R.H. Friend, et al., "Electroluminescence in conjugated polymers," Nature, vol. 397, Jan. 1999, pp. 121-128.

Markus Gross, et al., "Improving the performance of doped xx-conjugated polymers for use in organic light-emitting diodes," Nature, vol. 45, Jun. 2000, pp. 661-664.

D.Y. Kim et al., "Blue light emitting polymers," Prog. Polym. Sci. 25 (2000) pp. 1089-1139.

Christoph Weder, et al., "Incorporation of Photoluminescent Polarizers into Liquid Crystal Displays," Science, vol. 279, Feb. 1998 pp. 835-837.

J.M. Hong, et al., Synthesis and Luminescence Studies of Poly(fluorenylene ethynylene)s, Synthetic Metals, 102 (1999), pp. 933-934.

J.B. Kim, et al., "Novel fluorene-based polymers containing acetylene units," Synthetic Metals, 119 (2001), pp. 105-106.

Yasuyuki Saito, et al., "Deep-Level Transient Spectroscopy Spectra of Drain Current of Si-Implanted GaAs Metal-Semiconductor Field-Effect Transistors Having Large and Small Low-Frequency Oscillations," Japanese Journal of Applied Physics, vol. 30, No. 9A, Sep. 1991, pp. 1940-1941.

I. Levesque, et al., "Organic tunable electroluminescent diodes from polyfluorene derivatives," Synthetic Metals, 122 (2001), pp. 79-81.

Katsumi Yoshino, et al., Gel chromism and anomalous luminescence in poly(3-alkylthiophene), Synthetic Metals, 50 (1992), pp. 491-497.

C. Zhang, et al., "Blue electroluminescent diodes utilizing blends of poly(p-phenylphenylene vinylene) in poly(9-vinylcarbazole," Synthetic Metals, 62, (1994), pp. 35-40.

M. Inbasekaran, et al., "Fluorene homopolymers and copolymers," Synthetic Metals 111-112, 2000, pp. 397-401.

G. Grem, et al., "Realization of a Blue-Light-Emitting Device using Poly(p-phenylene)," Adv. Mater. 4, 1992, No. 1, pp. 36-37.

Translation of Cover Page of Annual Meeting of the Polymer Society of Korea held on Apr. 11, 2003.

"Highly phenyl-substituted fluorene copolymer for light-emitting diode l"; 2PS-162; Apr. 28, 2003.

POLYARYLENE COMPOUNDS, POLYMERS THEREOF, AND ELECTROLUMINESCENCE ELEMENT USING THE SAME

BACKGROUND OF THE INVENTION

1. Field of the Invention

The present invention relates to new arylene compounds having polypenylene group and polymers thereof, which can be used as an organic or polymeric semi-conducting material or a optoelectronic material, and especially, as a electroluminescence (hereinafter, referred to as "EL") material, to a method for preparing the same, and to an EL element using the same.

2. Description of the Related Art

Generally, polymers of poly(phenylene vinylene) (hereinafter, referred to as "PPV"), of polythiophene (hereinafter, referred to as "PTh") and of polyphenylene (See *Synth. Met.*, 50 (1–3), p. 491 (1992); *Adv. Mater.*, 4, p. 36 (1992); *Adv. Mater.*, 6, p. 190 (1994); and *Chem. Rev.*, 99, p. 1747 (1999)) are known as organic polymer semiconductor and optoelectronic materials (See *Semiconducting Polymers: Chemistry, Physics and Engineering*, edited by G. Hadziioannou; and P. F. van Hutten, WILEY-VCH (2000)) or as materials for polymer luminescence (See *Angew Chem. Int. Ed.*, 37, p. 402 (1998); *Nature*, 397, p. 121 (1999); *Prog. Polym. Sci.*, 25, p. 1089 (2000); and *Adv. Mater.*, 12, p. 1737 (2000)). Until now, researches into these polymer materials have been conducted, but such materials have disadvantages in that final products are not dissolved in an organic solvent. PPV or PTh derivatives, which are improved their processability by introducing appropriate substituents and illuminate light of blue, green or red color, have also been known (See *Synth. Met.*, 62, p. 35 (1994); *Adv. Mater.*, 4, p. 36 (1992); and *Macromolecules*, 28, p. 7525 (1995)). Some of them have been known to have excellent processability because they are soluble in an organic solvent in spite of their large molecular weight (See *Adv. Mater.*, 10, p1340 (1998)).

Recently, a lot of fluorene-based polymers have been reported as luminescence materials (See *Jpn. J. Appl. Phys.*, 30, pL1941 (1991); *J. Polym. Sci. Polym. Chem.* Ed., 31, p. 2465 (1993); *J. Am. Chem. Soc.*, 118, 7416 (1996); *Adv. Mater.*, 9, p. 326 (1997); *Adv. Mater.*, 10, p. 993 (1998); *Macromolecules*, 32, p. 1476 (1999); *Nature*, 405, p. 661 (2000); *Syn. Met.*, 111–112, p. 397 (2000); *Syn. Met.*, 122, p. 79 (2001) and *J. Am. Chem. Soc.*, 123, 946 (2001)).

In addition, the U.S. Pat. Nos. 5,621,131; 5,708,130; and 5,900,327 disclose fluorene-based polymers having single bonds and the U.S. Pat. No. 5,807,974 discloses fluorene-based alternating copolymers having conjugate double bonds, which are luminescent materials for an EL element.

Polymers having acetylene groups have also been reported as organic polymer semiconductor and photoelectronic materials (See *Macromol. Chem.*, 191, p. 857 (1990); *Macromolecules*, 27, p. 562 (1994); *J. Chem. Soc., Chem. Commun.*, p. 1433 (1995); and *Macromolecules*, 29, p. 5157 (1996)), which are mainly materials for nonlinear optics, photoconductivity or photoluminescence (hereinafter, referred to as "PL"). *Syn. Met.*, 102, p933 (1999) is an example of using these polymers as an EL material, and other applications have been also reported (See *Science*, 279, p. 835 (1998)).

In addition, polymers having diacetylene groups have been reported (See *Prog. Polym. Sci.*, 20, p. 943 (1995); *CHEMTECH*, October, p. 32 (1993)); *Macromolecules*, 29, p. 2885 (1996); *Syn. Met.*, 111–112, p. 429 (2000); and *Syn. Met.*, 119, p. 105 (2001). These polymers are as sensitive to heat or light as the acetylene group polymers, and therefore, they can be easily cross-linked, to give stable cross-linked polymers. An example of applying polymers having acetylene or diacetylene groups for EL materials has patented by the present inventors (the U.S. Pat. No. 5,876,864 and the Japanese Patent No. 3,046,814). These polymers can also be applied for materials of nonlinear optics, heat resistant polymers, polarized PL polymers, and electrically or optically active polymers.

Meanwhile, polyphenylene group polymers having a plurality of phenyl groups (See *J. Polym. Sci.*, Part B, 4, p. 791 (1966); *J. Polym. Sci.*, Part A-1, 5, p. 2721 (1967); *J. Polym. Sci.*, Part B, 7, p. 519 (1969); *Macromolecules*, 5, p. 49 (1972); *Macromolecules*, 28, p. 124 (1995); *Macromolecules*, 33, p. 3525 (2000)) can be obtained by Diels-Alder reaction between a compound having a bis(acetylene) group and a compound having a bis(cyclopentadienone) group (See *J. Org. Chem.*, 28, p. 2725 (1963); *Chem. Rev.*, 65, p. 261 (1965); *J. Org. Chem.*, 30, p. 3354 (1965); and the U.S. Pat. No. 4,400,540). This is a polymerization reaction that a molecular weight is increased while carbon monoxide is removed. This polymerization is carried out at 100° C.–400° C. without a solvent, or with a solvent selected from toluene, diphenyl ether, o-diclorobenzene and cyclohexylbenzene, by which a polymer is obtained in high yield of more than 80%. Since the obtained polymers have several phenyl groups, they are thermally stable and easily dissolved in an organic solvent while having high molecular weight. Accordingly, such polymers can be applied as a photoreceptor (See the U.S. Pat. No. 5,882,829), or as a dielectric substance in microelectronics industry, especially, in the field of integrated circuits (See the U.S. Pat. No. 5,965,679). Polyphenylene group polymers can be also obtained by Eidls-Alder reaction of bis(α-pyrone)s or bis(thiophene dioxide)s, instead of bis(cyclopentadienone) (See *J. Chem. Soc. Perkin Trans* 1 p. 355 (1994); and the U.S. Pat. Nos. 2,971,944 and 2,890,207).

However, in the case of the aforementioned monomers, that is, bis(acetylene) compounds or bis(cyclopentadienone) compounds, costs for preparing are high, or preparing procedures are difficult, and therefore, various kinds of such monomers have not been provided. Especially, in the case of the bis(cyclopentadienone) compounds, its kind is so limited that polyphenylene group polymers having various properties and structures can not be prepared.

SUMMARY OF THE INVENTION

Therefore, an object of the present invention is to provide a new arylene compound of various structures having polypenylenes, for which structures can be identified, and which can be dissolved in an organic solvent and can be used as an EL or other photo-electronic material, obtained from a variety of acetylene compounds and fluorene-based bis(cyclopentadienone) monomers.

Another object of the present invention is to provide a new arylene polymer obtained from said arylene compounds.

Still another object of the present invention is to provide an EL element using said arylene compound or polymer as a light-emitting material.

The aforementioned and other objects of the present invention will become more apparent from the following detailed description of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
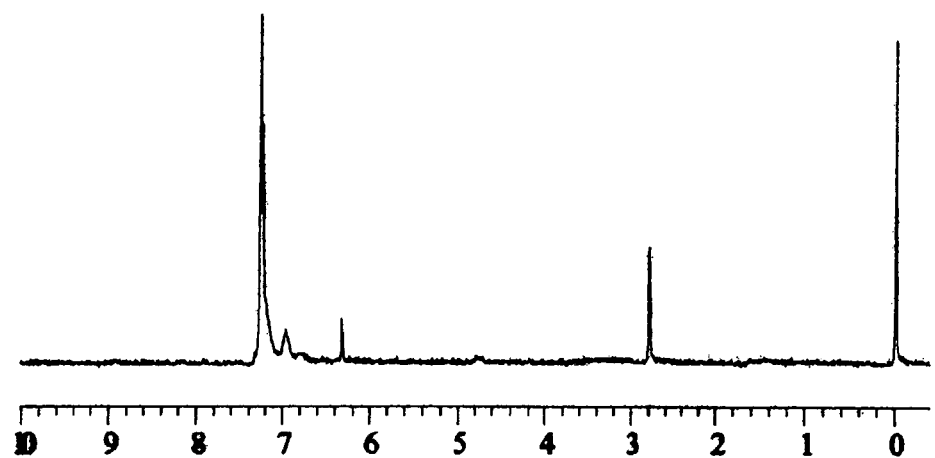
FIG. 1 shows $^1$H NMR spectra of the monomer M-29 of Example 29.

Reference will now be made in detail to the preferred embodiments of the present invention, examples of which are illustrated in the accompanying drawings.

The inventors of the present invention have made diligent efforts to solve the aforementioned problems of the prior art and reached the present invention. The present invention provides a variety of arylene compounds, which are prepared by Diels-Alder reaction between a variety of acetylene compounds and arylene-based bis-cyclopendienon monomers, polymers thereof and applications thereof as a light-emitting material.

The fluorene compounds and polymers thereof according to the present invention are represented by the following formula (1):

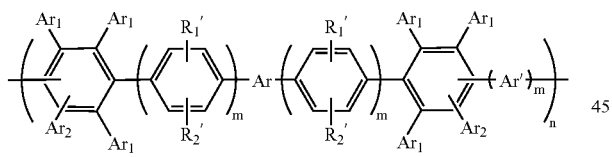

(1)

In formula (1), $R_1$, $R_2$, $R_1'$ and $R_2'$ are the same with or different from each other, and respectively represent hydrogen, $C_1$–$C_{22}$ aliphatic alkyl, cycloalkyl, or alkoxy group, or $C_6$–$C_{18}$ aryl or aryloxy group. More specifically, $R_1$, $R_2$, $R_1'$ and $R_2'$ may be hydrogen, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, docosyl, cyclopropyl, cyclopentyl, cyclohexyl, methoxy, ethoxy, buthoxy, hexyloxy, methoxyethoxyethyl, methoxyethoxyethyl, cyanoethyl, carboxymethyl, phenyl, phenoxy, tolyl, benzyl, naphthyl, anthrancenyl, or a derivative thereof. $R_1$, $R_2$, $R_1'$ and $R_2'$ may also include an alkyl or aryl derivative of silicon, tin, germanium or the like, or a halogen atom, and examples of such substituents may include trimethylsilyl, triphenylsilyl, tributyltin, triethylgermanium, and a halogen atom such as iodine, bromine and chlorine.

In formula (1), $Ar_1$ and $Ar_2$ may be the same with or different from each other, and respectively may represent hydrogen, trimethylsilyl, bromine and/or an alkyl group as in the $R_1$, $R_2$, $R_1'$ and $R_2'$. $Ar_1$ and $Ar_2$ may mainly represent an aromatic substituent having 6 to 18 carbon atoms, respectively, such as phenyl, naphthyl and derivatives thereof.

In formula (1), Ar and Ar' are an aromatic or heterocyclic group such as phenylene, naphthalene, anthracene, fluorene, thiophene, pyrrole, pyridine, aryloxadiazole, triazole, carbazole, arylamine, arylsilane and derivatives thereof, but not limited thereto. Especially preferable examples of the Ar and Ar' include the following:

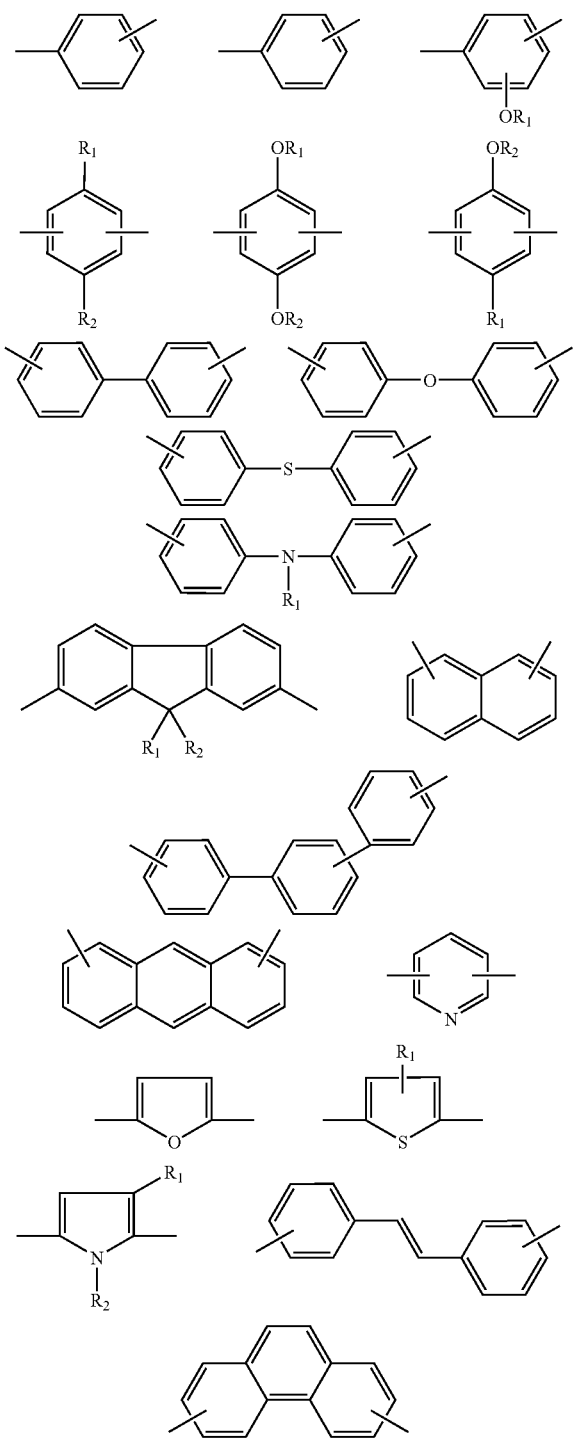

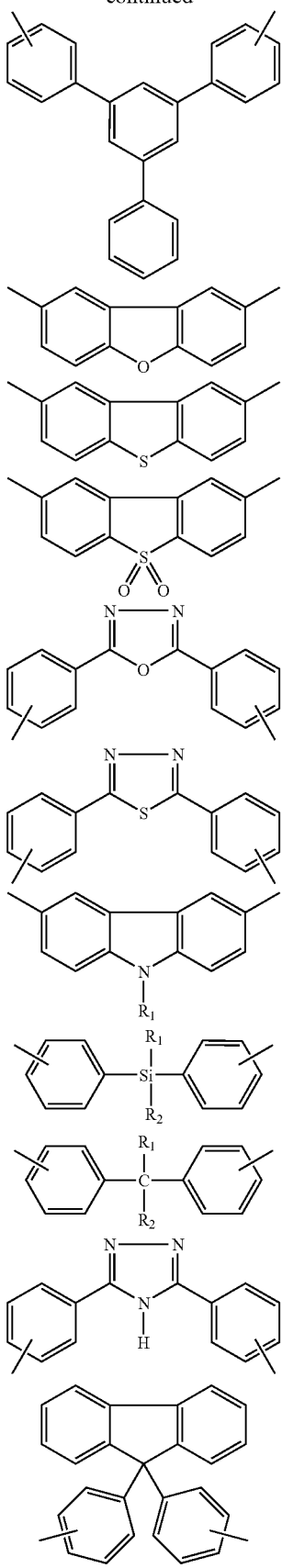

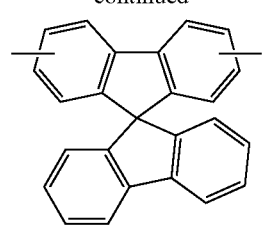

In formula (1), m is 0 or an integer of above 1, and n is an integer of above 1.

The arylene compounds and polymers thereof of the present invention include a reaction or polymerization product between the same arylene compounds of the present invention, that is, a homopolymer, a reaction or polymerization product between arylene compounds of the present invention which are different from each other, that is, a copolymer, and a reaction or polymerization product between the arylene compound of the present invention and other organic compound.

The kinds of the compounds and polymers thereof according to the present invention are not specially limited, and any compounds and polymers thereof can be used so long as it can be easily prepared and has excellent EL properties.

The arylene compounds according to the present invention can be prepared by any one of the methods as shown in the following reaction schemes 1 to 15:

Reach Scheme 1:

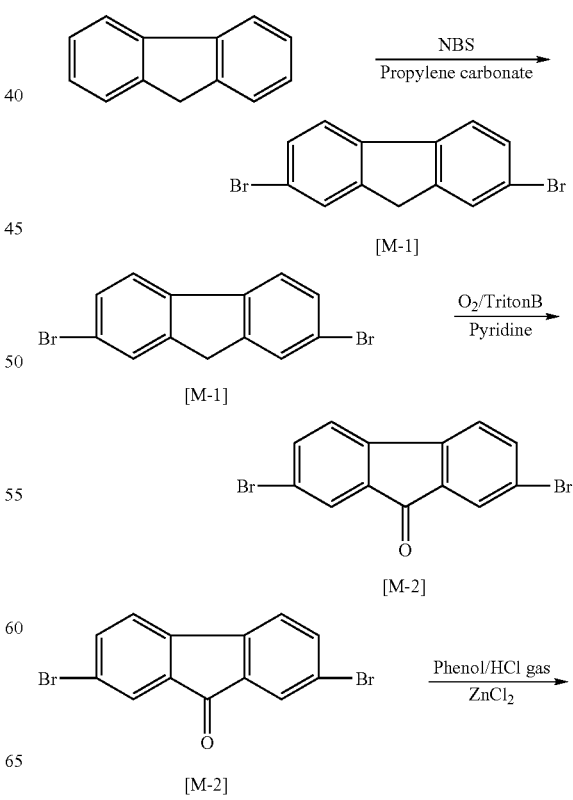

-continued
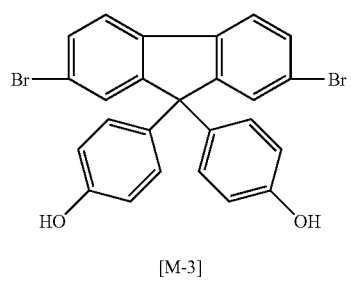
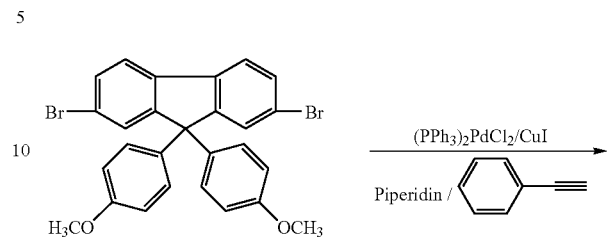
Reach Scheme 2:
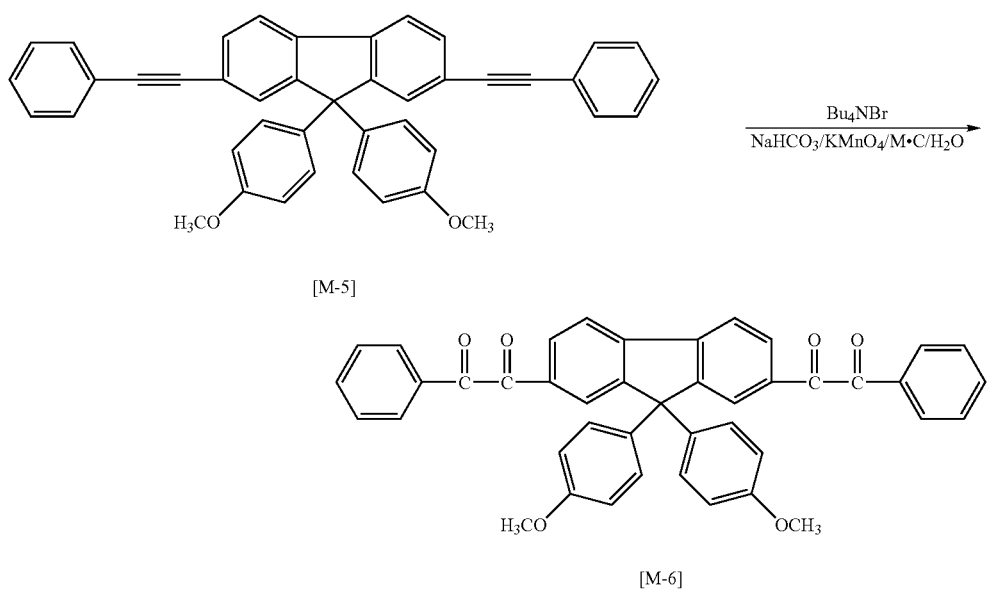

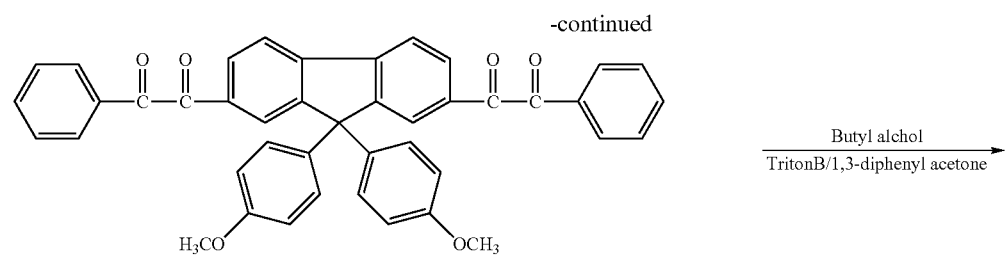
[M-6]
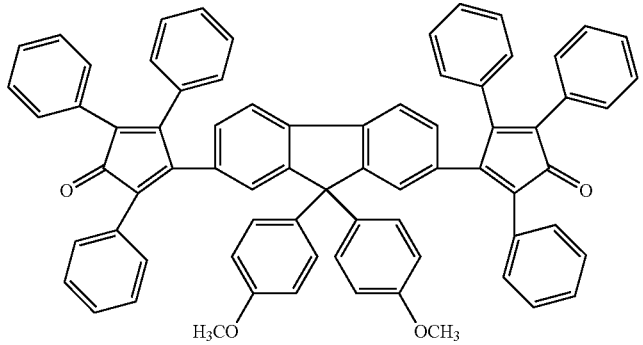
[M-7]
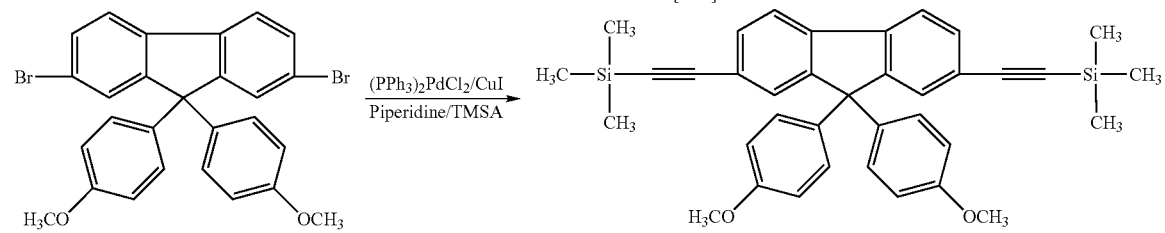
[M-4]　　　　　　　　　　　　　　　　　　[M-8]
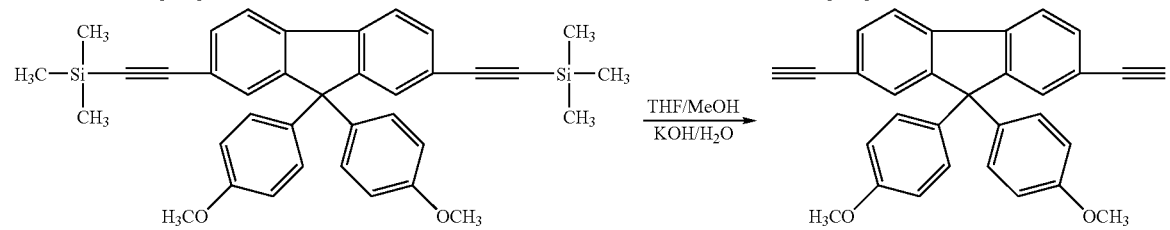
[M-8]　　　　　　　　　　　　　　　　　　[M-9]
Reach Scheme 3:
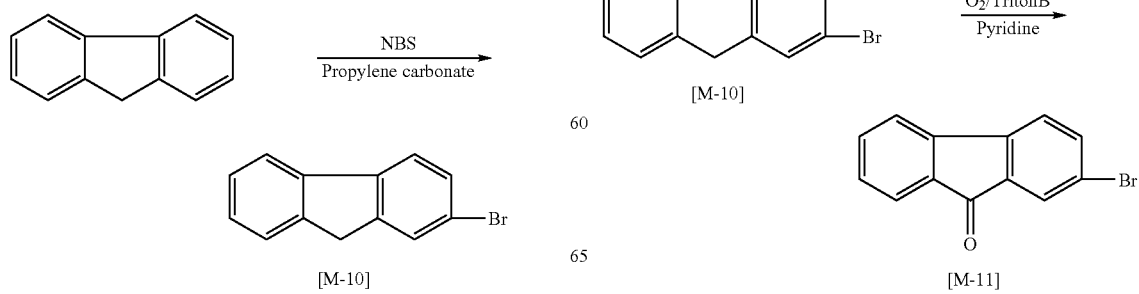
[M-10]　　　　　　　　　　　　　　　　　　[M-11]

-continued
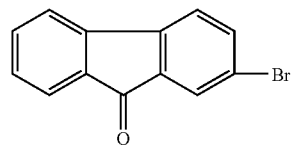
[M-11]
Phenol/HCl gas / ZnCl₂ →
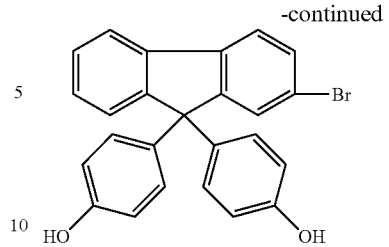
[M-12]
DMAc/CH₃I / K₂CO₃ →
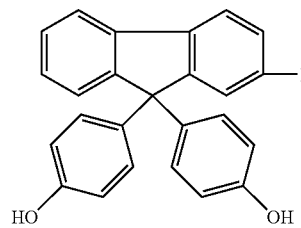
[M-12]
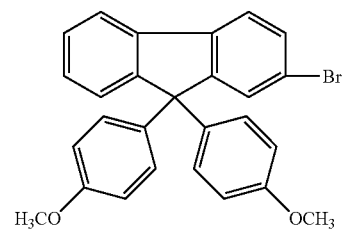
[M-13]
Reach Scheme 4:
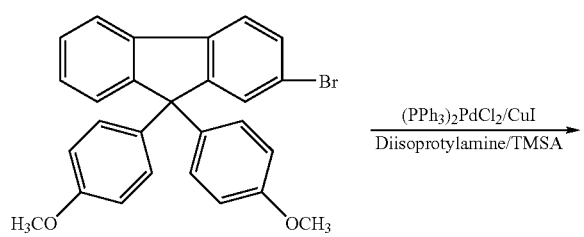
[M-13]
(PPh₃)₂PdCl₂/CuI / Diisoprotylamine/TMSA →
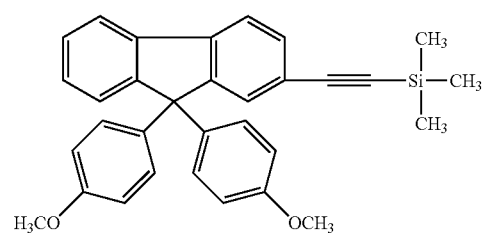
[M-14]
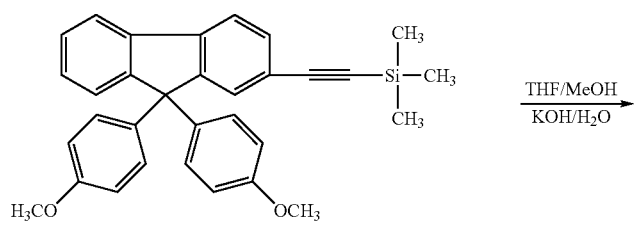
[M-14]
THF/MeOH / KOH/H₂O →
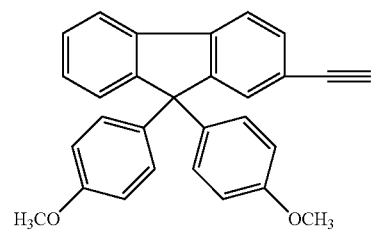
[M-15]
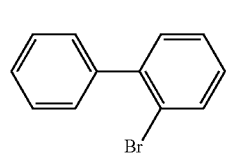
i) Diethyl ether/Mg/trace I₂ →
ii) Ether / 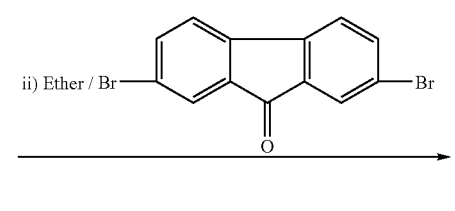 →

-continued
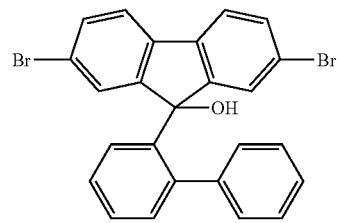
[M-16]
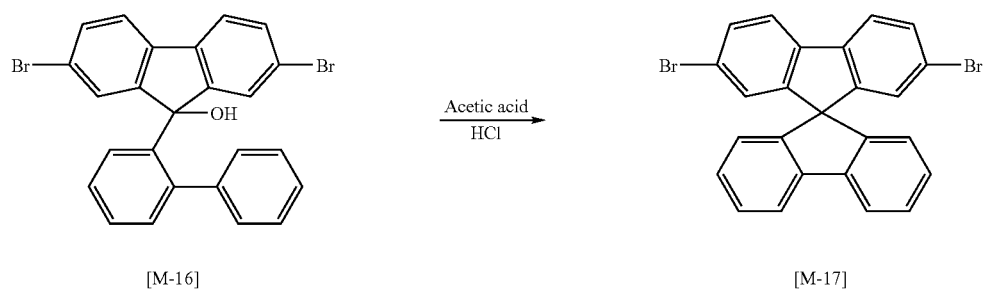
[M-16]     [M-17]
Reach Scheme 5:
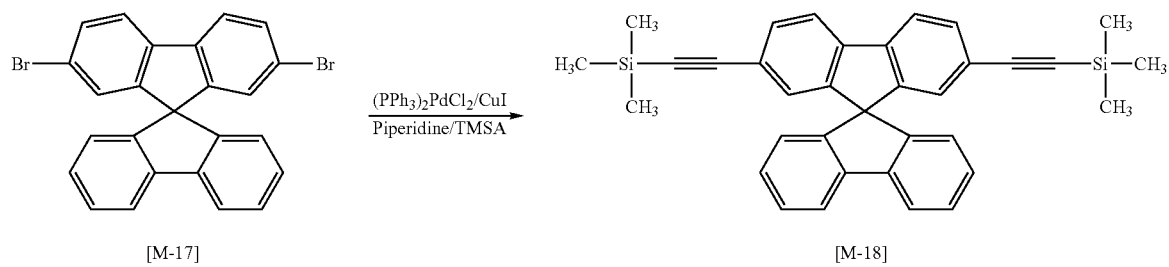
[M-17]     [M-18]
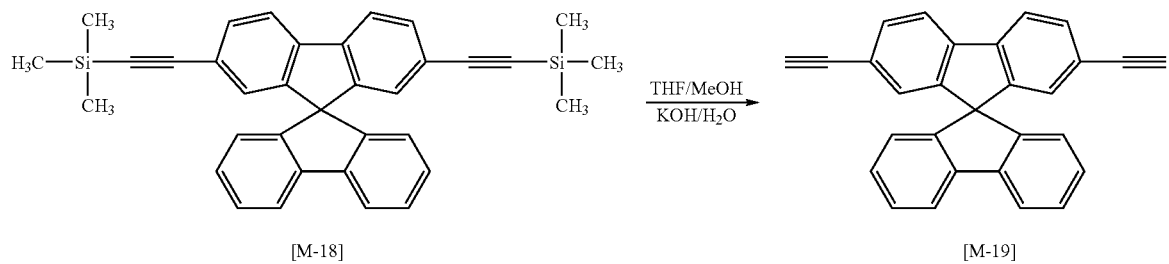
[M-18]     [M-19]
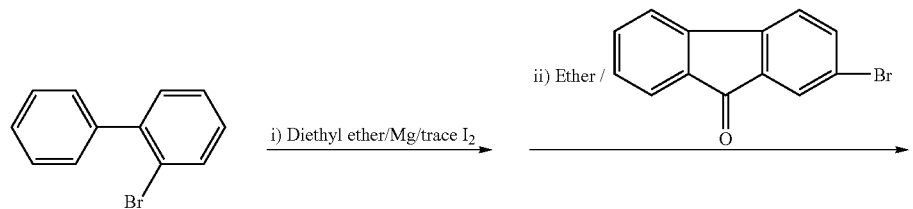

-continued
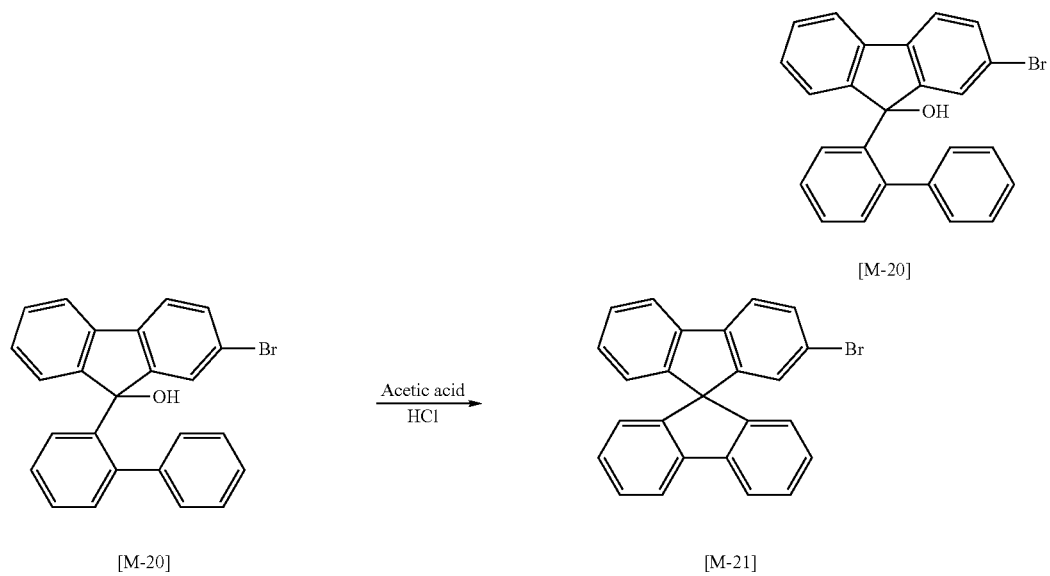
Reach Scheme 6:
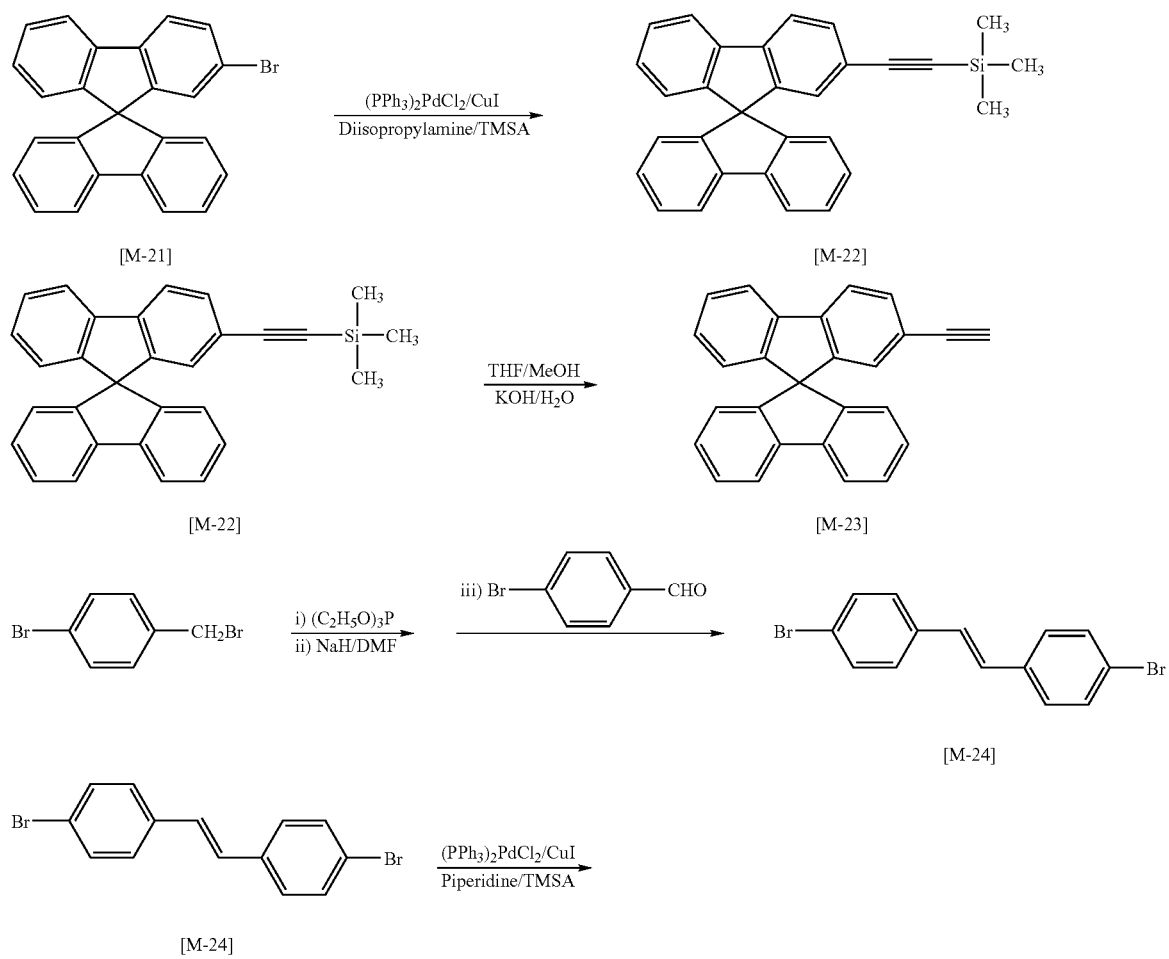

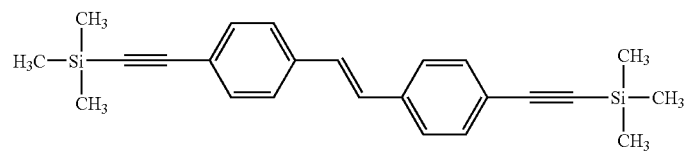
[M-25]
Reach Scheme 7:
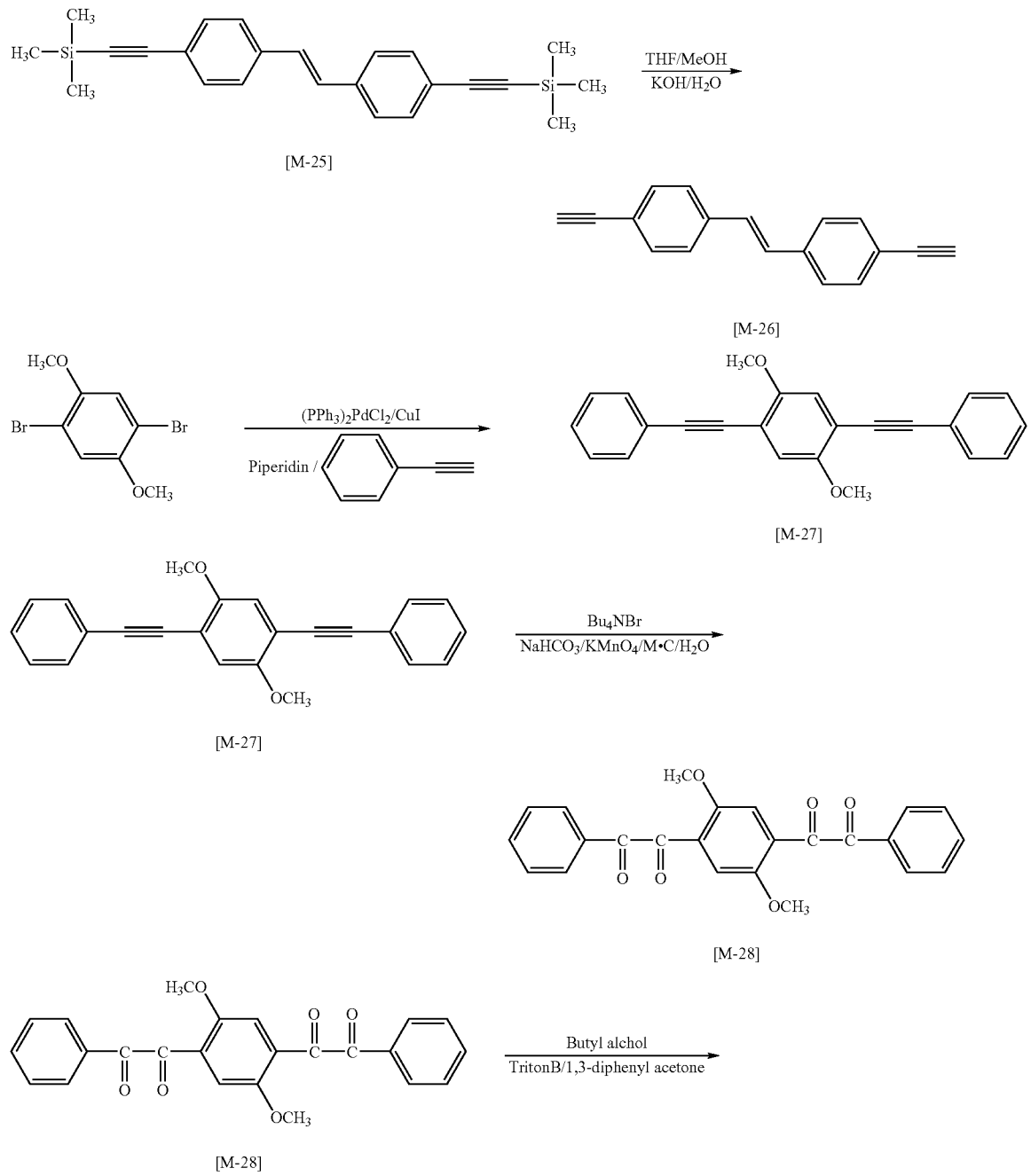

-continued
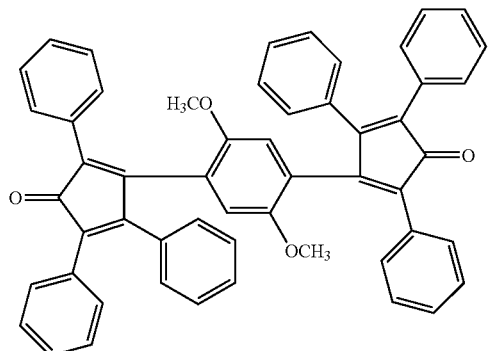
[M-29]
Reach Scheme 8:
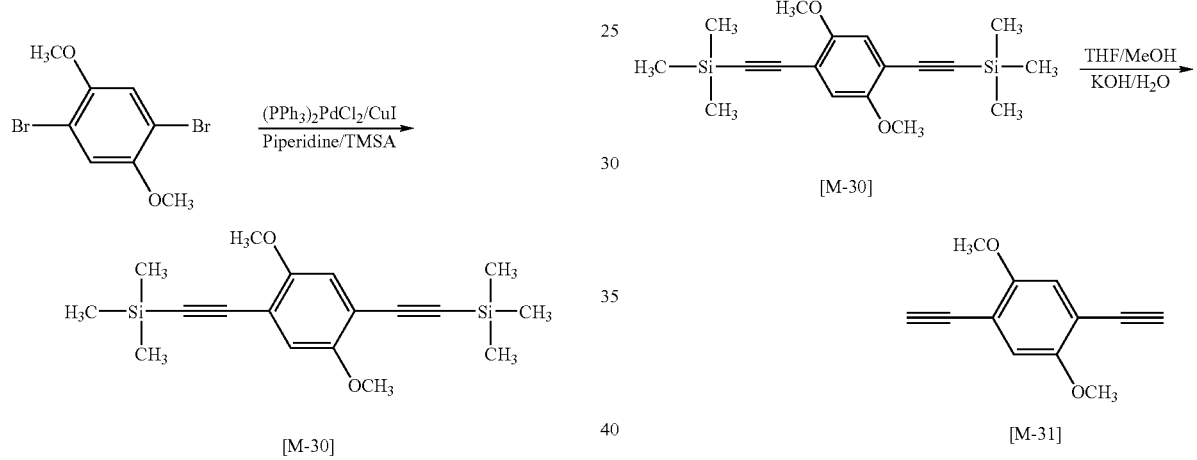
Reach Scheme 9:
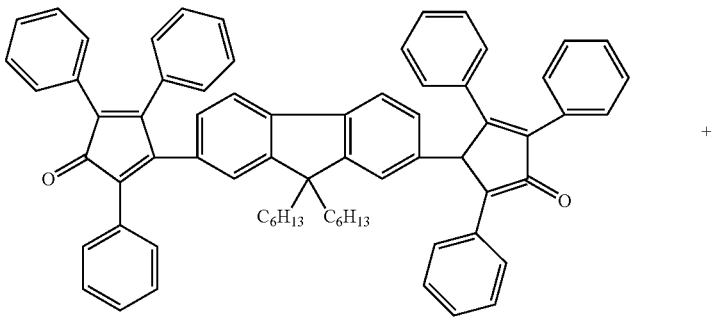
+

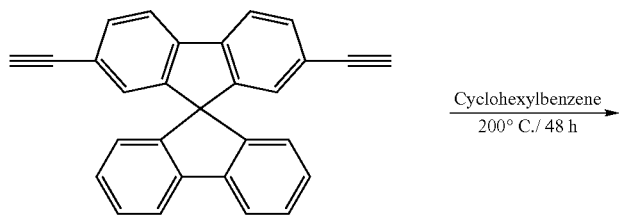
[M-19]
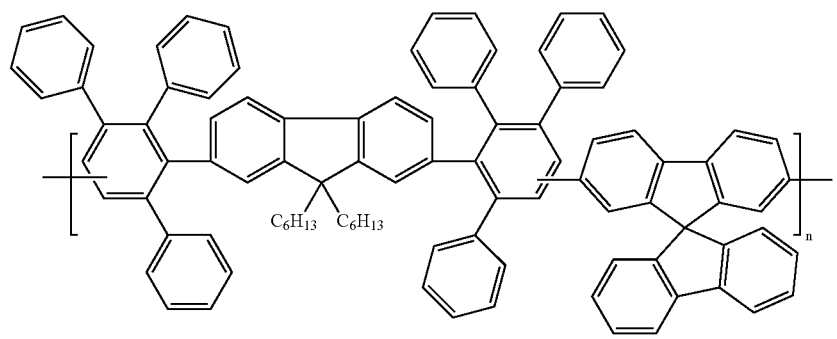
[P-1]
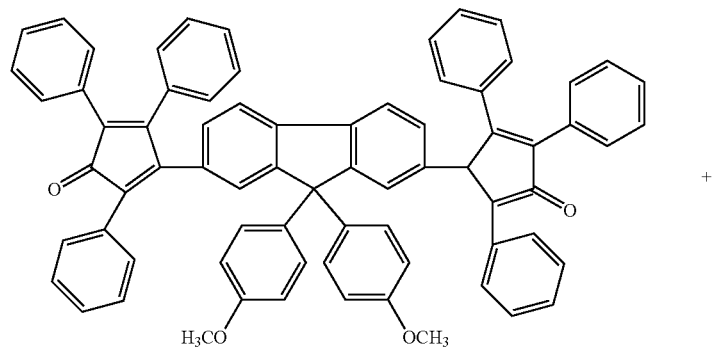
[M-7]
+
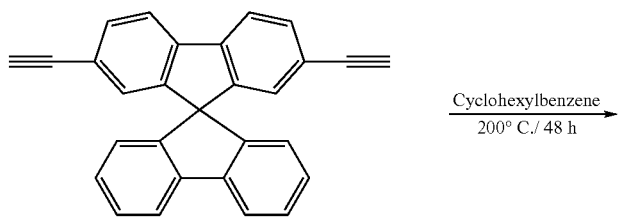
[M-19]

-continued
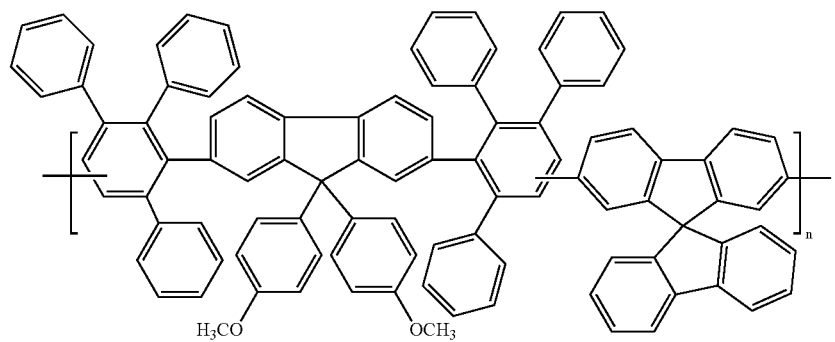
[P-2]
Reach Scheme 10:
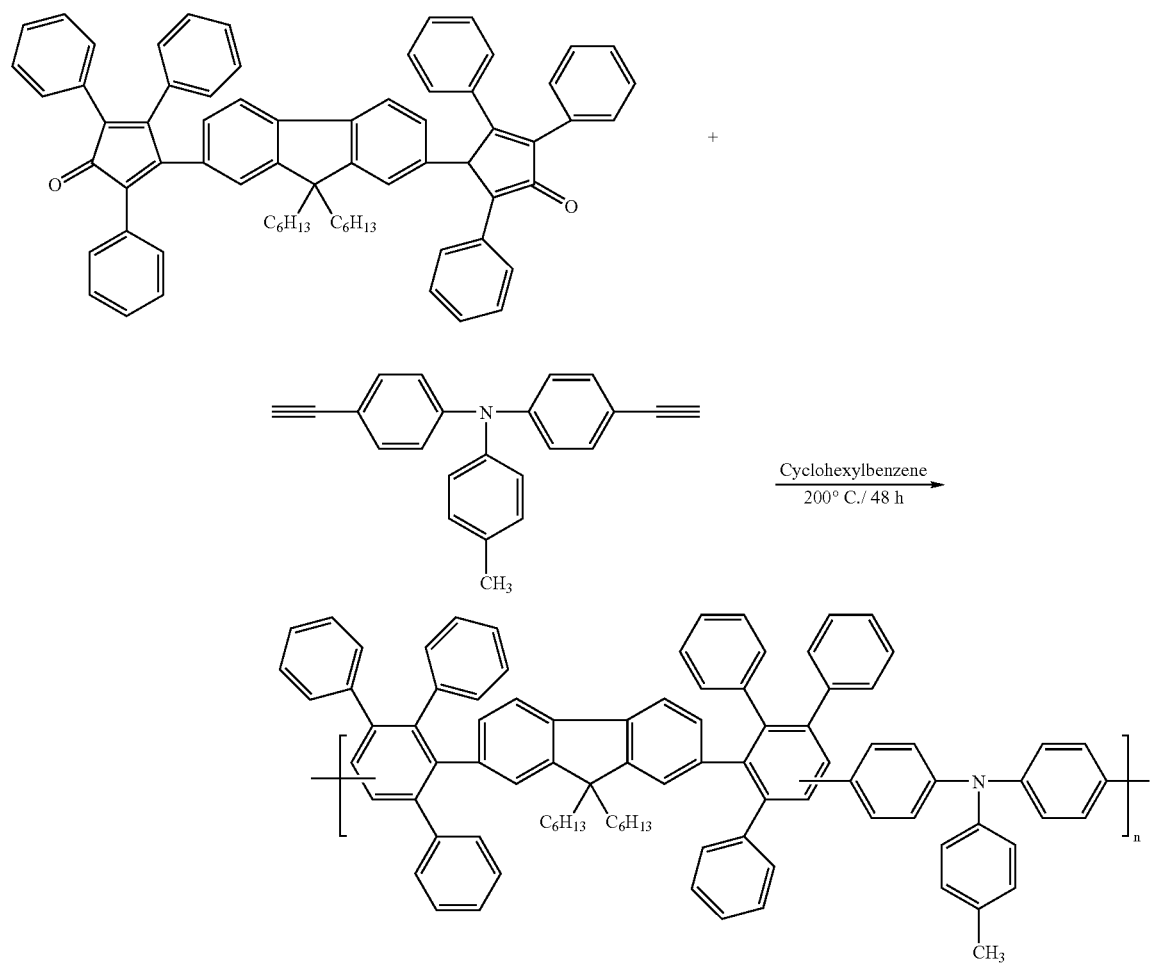
[P-3]

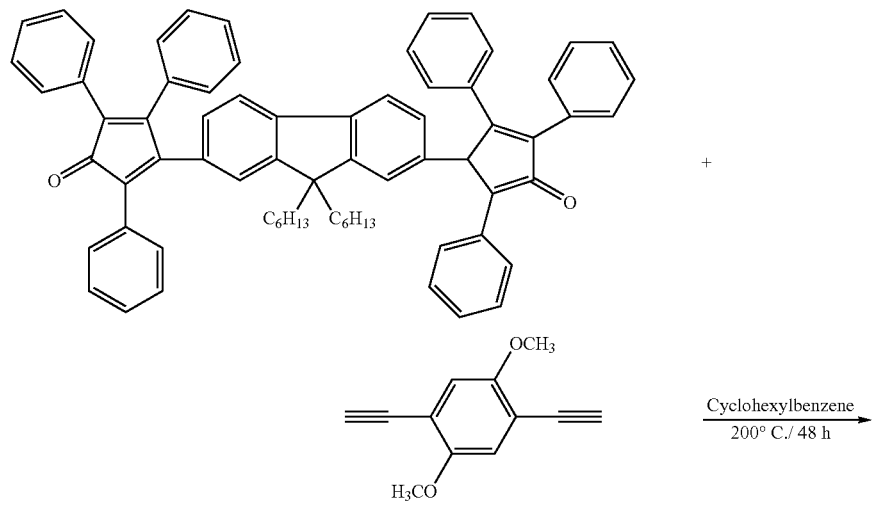
[M-31]
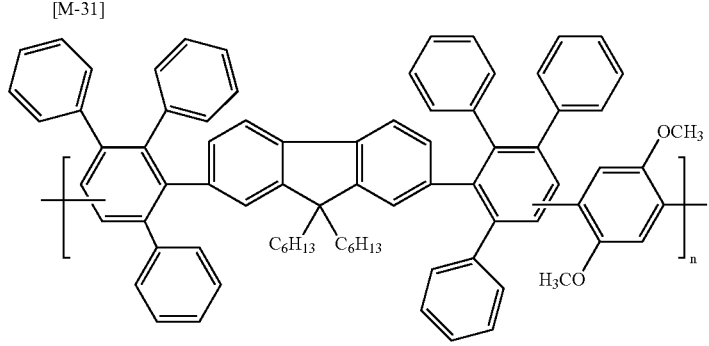
[P-4]
Reach Scheme 11:
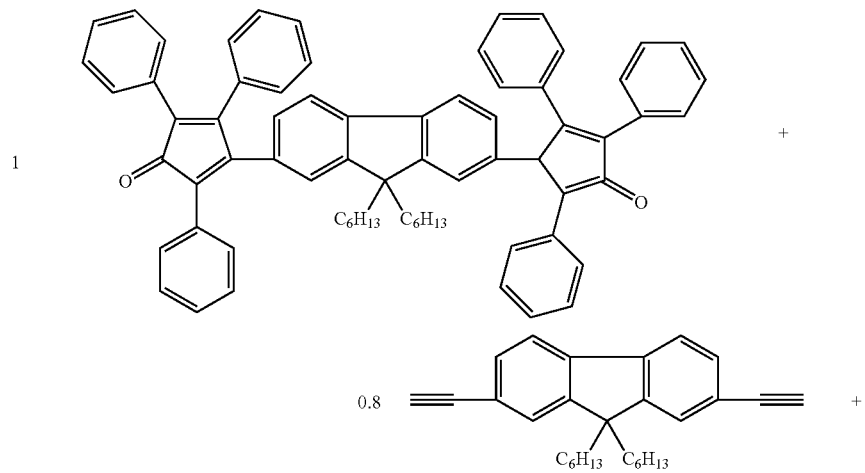

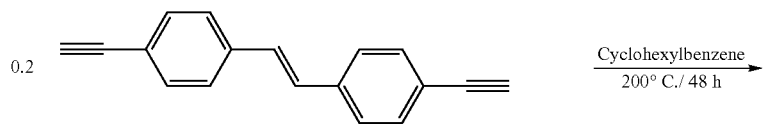
[M-26]
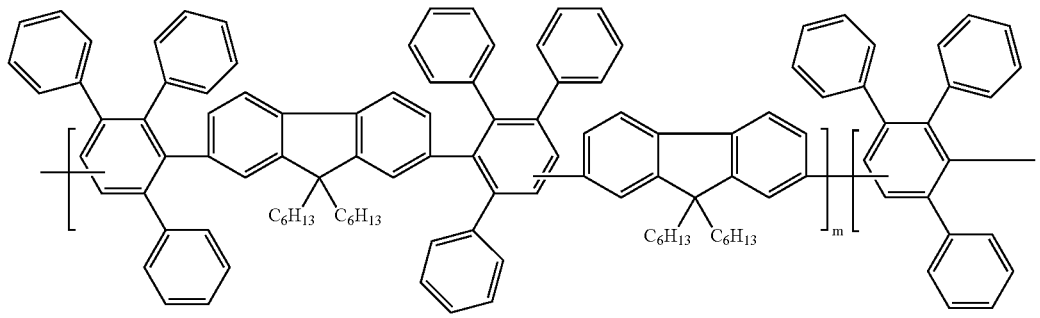
[P-5]
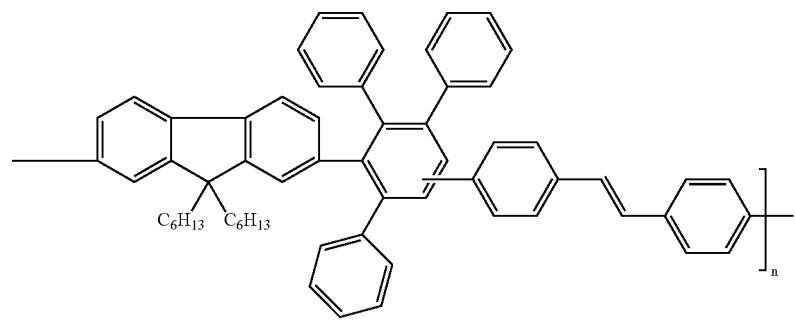
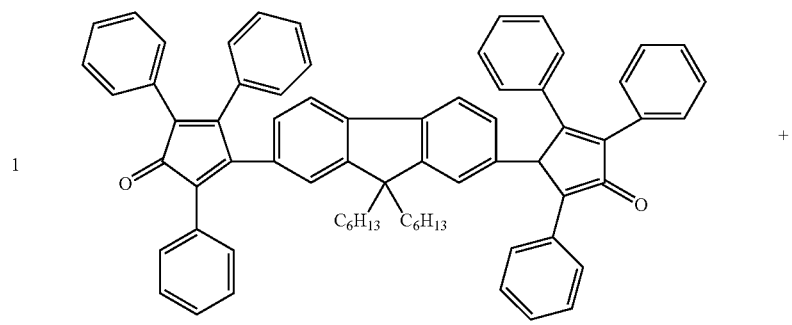
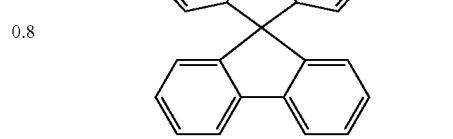
[M-19]
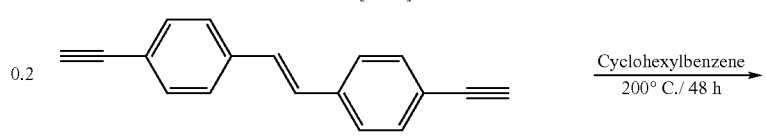
[M-26]

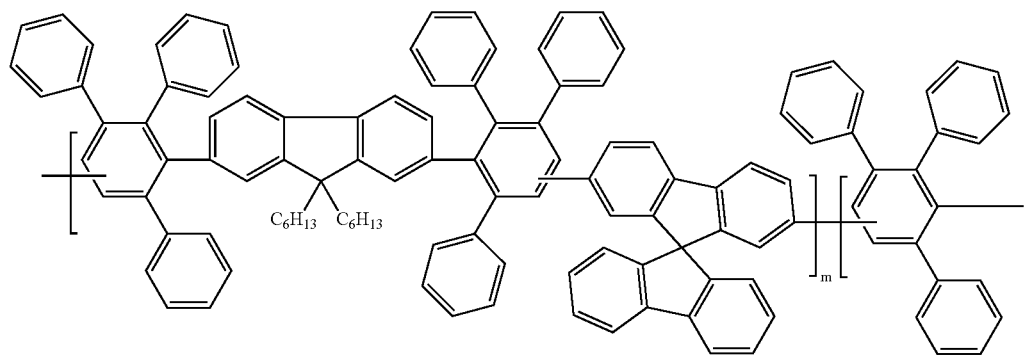
[P-6]
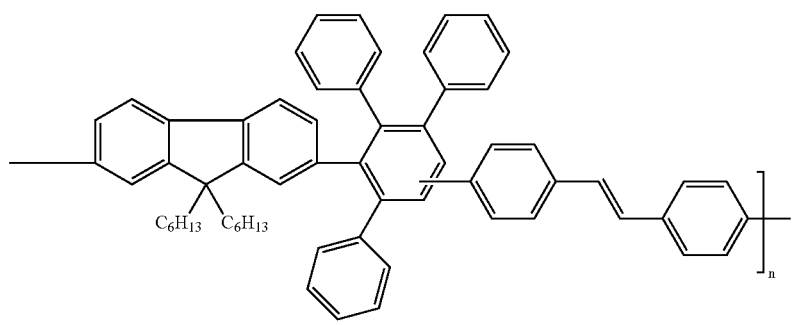
Reach Scheme 12:
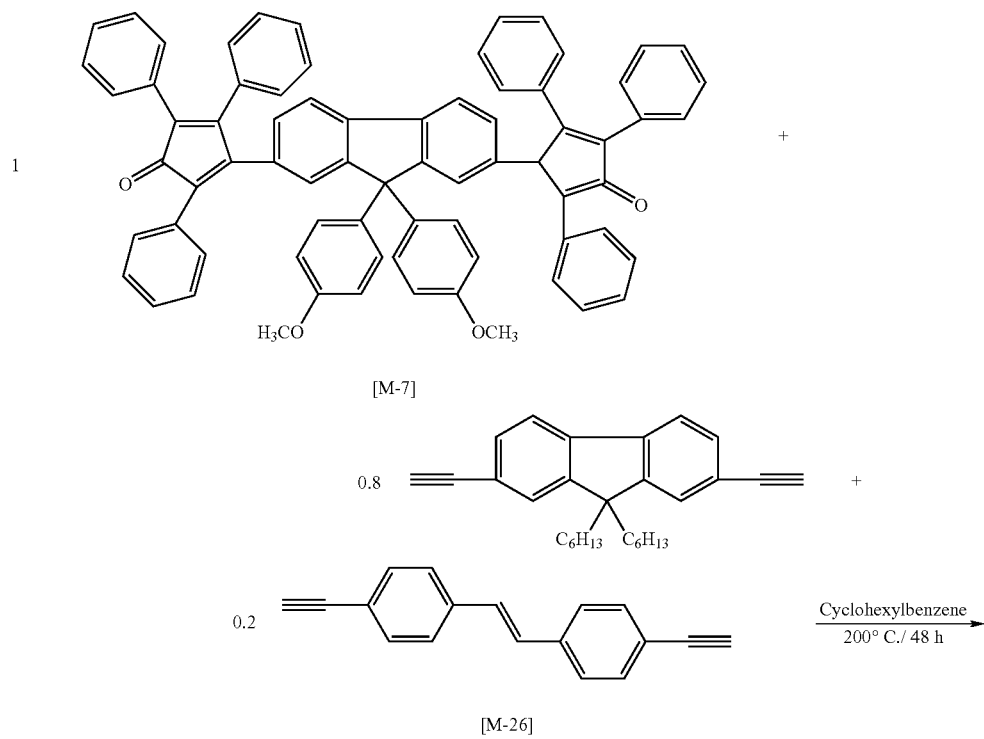

-continued
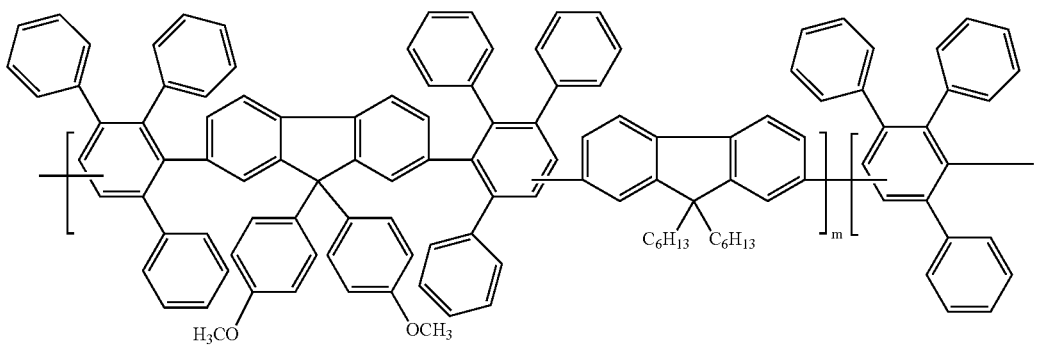
[P-7]
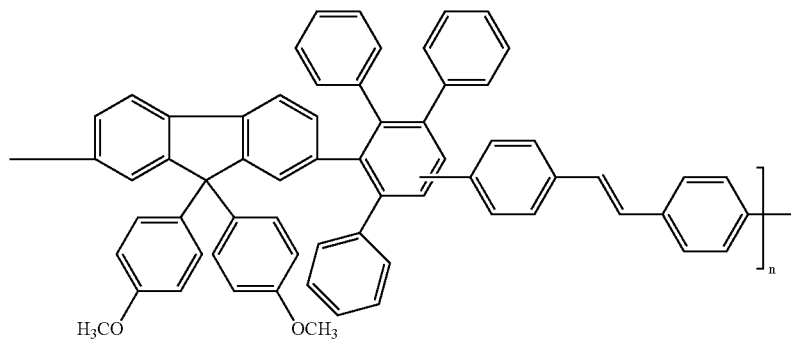
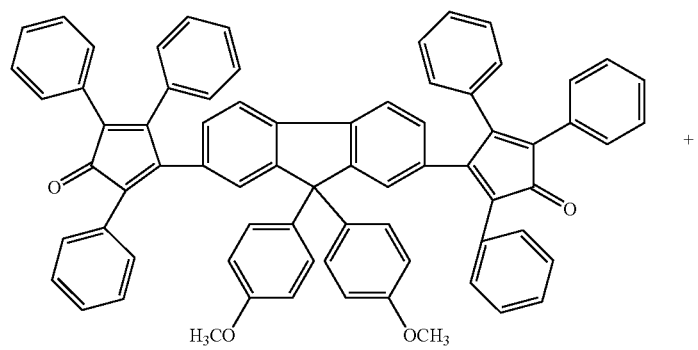
[M-7]
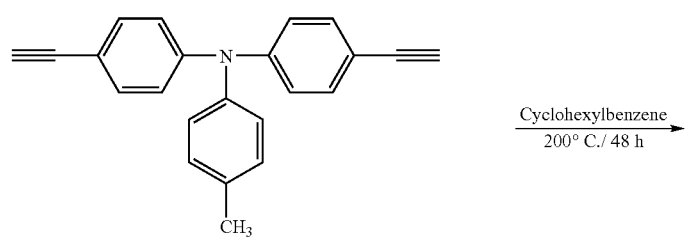
$$\xrightarrow{\text{Cyclohexylbenzene}}_{200°\text{C.}/48\text{ h}}$$

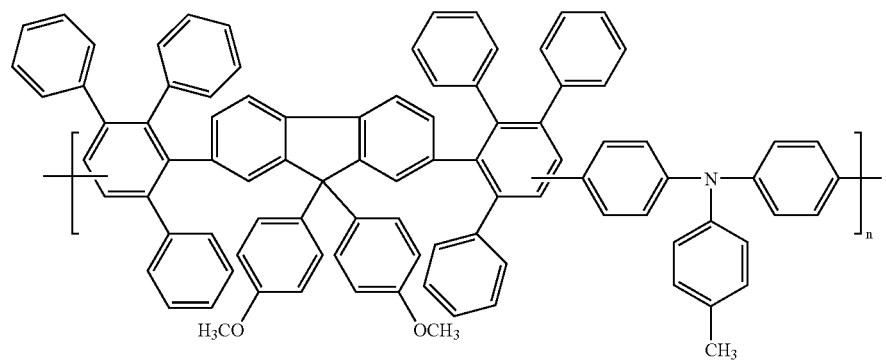
[P-8]
Reach Scheme 13:
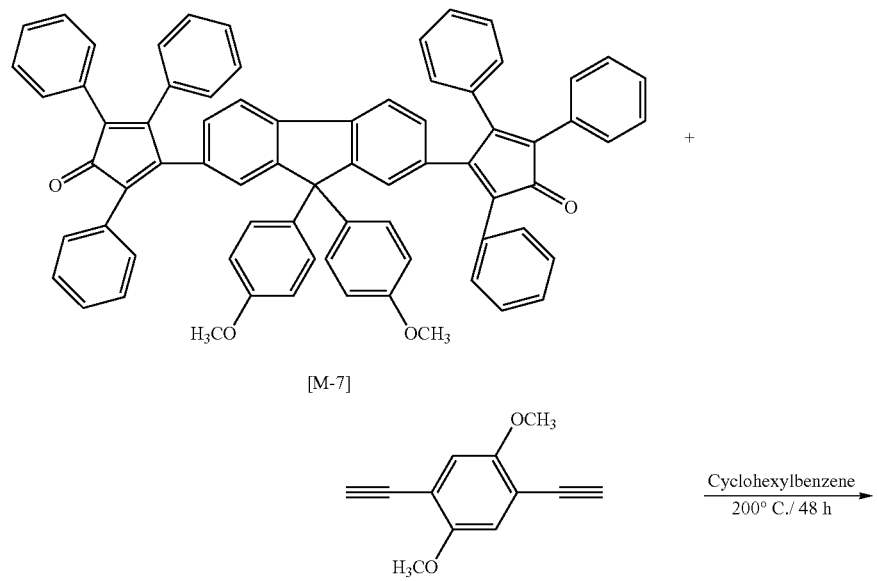
[M-7]
[M-31]
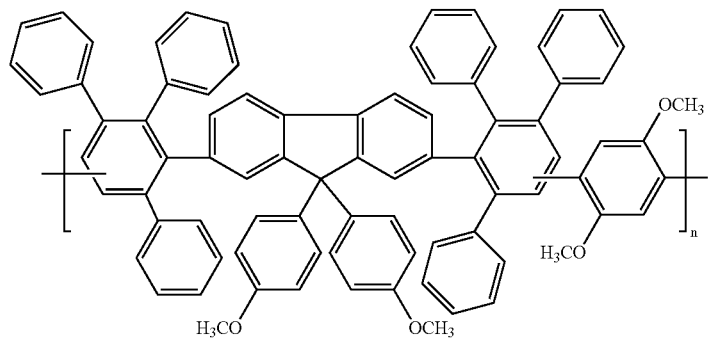
[P-9]

-continued
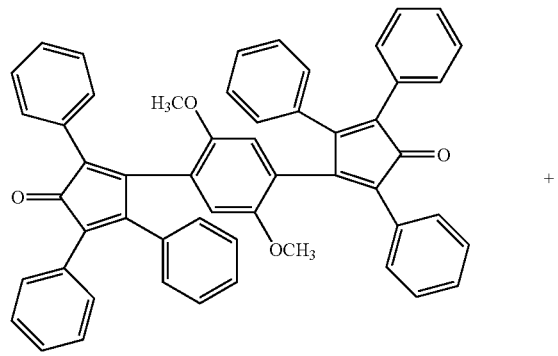
[M-29]
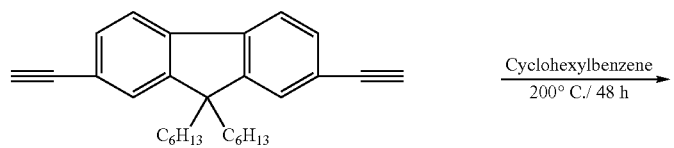
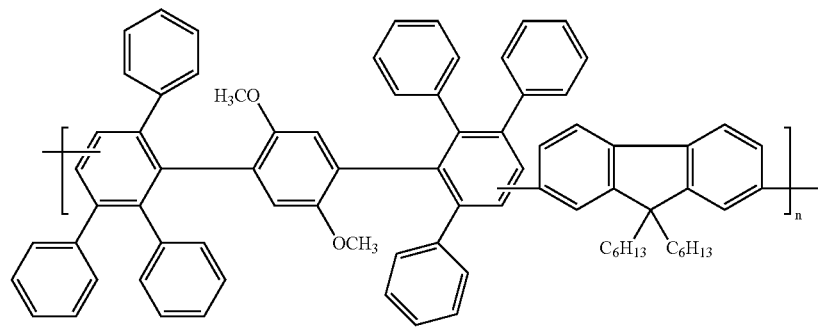
[P-10]
Reach Scheme 14:
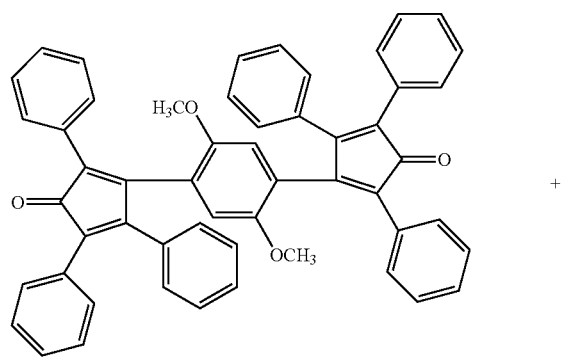
[M-29]

-continued
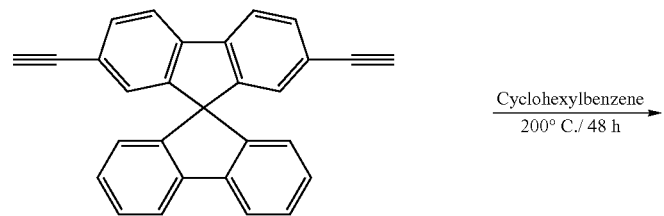
[M-19]
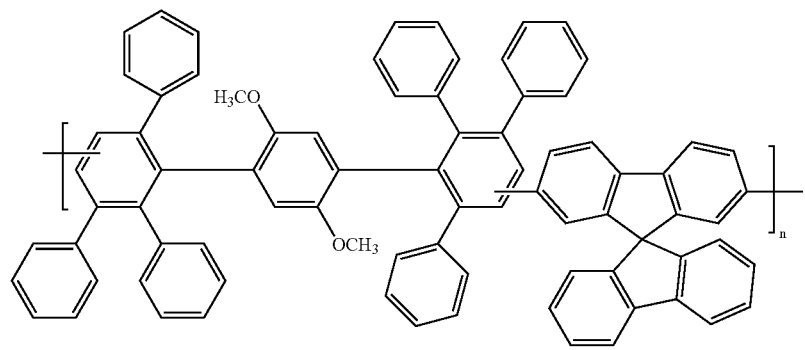
[P-11]
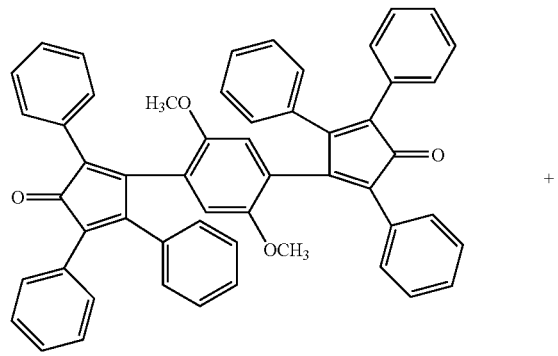
[M-29]
+
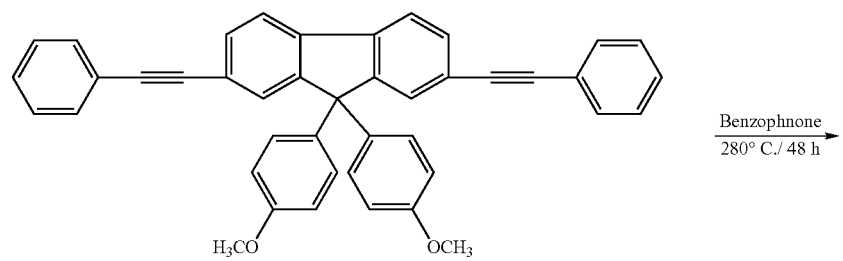
[M-5]

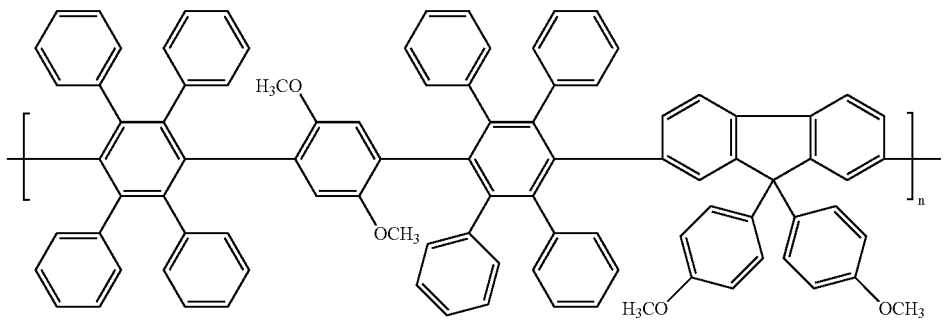

[P-12]

Reach Scheme 15:

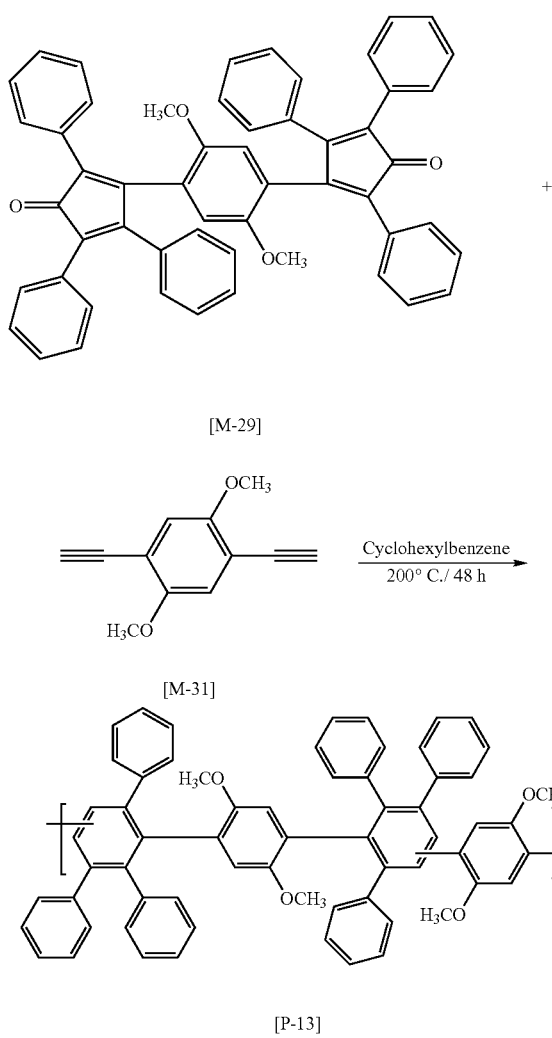

[P-13]

In addition to the reaction procedures as shown in Reaction Schemes 1 to 15, the arylene compounds or the polymers thereof according to the present invention can be prepared by using any known reactions if the final product has the same structure. That is, there is no need to limit a solvent, reaction temperature, concentration or catalyst used for preparing the arylene compounds or polymers thereof according to the present invention to the conditions as shown in the above reaction schemes, and it is also regardless of yield of the product.

An organic or polymeric EL element and/or other optical elements according to the present invention can be fabricated using the arylene compounds having various structures and functional groups and the polymers thereof as shown in the reaction schemes 1 to 15, as core materials.

The arylene compounds and/or polymers thereof can be made into a film by a known method such as vacuum deposition, spin coating, role coating, bar coating, ink jet coating and the like, and the film can be directly used as an EL material.

The EL element can be constructed as a typical element in which the material for the light-emitting layer is inserted between an anode and a cathode, that is, a typical element constitution of anode/light emitting layer/cathode. Further, it can be constructed as an element constitution having a hole and electron transporting layer materials (Japanese Laid-open patent publication Nos. 2-135361, 3-152184 and 6-207170), that is, an element constitution of anode/hole transporting layer/light-emitting layer/electron transporting layer/cathode. However, the constitution of the EL element of the present invention is not particularly limited thereto.

In the anode, a material in which a metal or metal oxide, such as indium-tin oxide (ITO), gold, copper, tin oxide, zinc oxide or the like, or an organic semiconducting compound, such as polypyrrole, polyaniline or polythiophene, is coated onto a transparent substrate, such as glass, transparent plastics, quartz or the like, in the thickness of 10 nm to 1 μm may be used as an electrode material. In the cathode, a metal such as sodium, magnesium, calcium, aluminum, indium, silver, gold, copper or the like, or alloys thereof may be used.

Known compounds such as polyvinylcarbazole, 2,5-bis(4'-diethylaminophenyl)-1,3,4-oxadiazole, N,N'-diphenyl-N,N'-(3-methylphenyl)-1,1'-biphenyl-4,4'-diamine (TPD) or the like may be used for the hole transporting layer, and tris(8-hydroxyquinolinato)aluminum, 2-(4'-t-butylphenyl)-5-(4''-biphenyl)-1,3,4-oxadiazole, 2,4,7-trinitro-9-fluorenone or the like may be used for the electron transporting layer. These compounds can be formed into a thin film by a known method for forming a thin film such as vacuum deposition, spin-coating, casting, LB method or the like.

The luminescent materials of the present invention can also be used by blending with the above hole or electron transporting layers, different polymers according to the present invention, or known luminescent polymers in the prior art such as soluble PPV or PTh derivatives. For instance, polyvinylcarbazole, poly(1,4-hexyloxy-2,5-phenylenevinylene), poly(3-hexylthiophene) or the like can be dissolved in an organic solvent, such as chloroform, together with the fluorene-based polymers of the present invention, and the resulting solution can then be coated as a thin film by spin coating, casting or the like. Although there is no particular limitations, the concentration of the fluorene-based luminescent polymers of the present invention is in the range of 0.001–99 wt %, preferably 0.1–50 wt % of the polyvinylcarbazole, and the thickness of the film is 5 nm–5 μm, preferably 50 nm–1 μm.

The luminescent material of the present invention can be blended with a polymer, which is soluble in any typical organic solvent and can be formed into a thin film, in the same concentration and thickness as described above. Such polymers can include thermoplastics such as polymethylmethacrylate, polyarcylate, polystyrene, polycarbonate, polyvinylchloride, polyethylene, polypropylene, polyacrylonitrile, polyvinylpyrrolidone, polyvinylalcohol, polyvinylacetate, polyvinylbutyral, polyvinylamine, polycaprolactone, polyethyleneterephthalate, polybutyleneterephthalate, polyurethane, ABS, polysulfone, polyvinylfluoride or the like, or resins for general use such as acetal, polyamides, polyimides, polyesters, alkyd, urea, furan, nylons, melamine, phenol, silicone, epoxy or the like.

EXAMPLES

The present invention will be described in more detail with the following Examples. It is to be understood that these Examples are merely illustrative and it is not intended to limit the scope of the present invention thereto.

Syntheses of Monomers

Example 1

Synthesis of 2,7-dibromo fluorene [M-1]

320 ml of propylenecarbonate and 40 g (0.24 mol) of fluorene were put into a 1 litter 3-neck round-bottom flask equipped with a stirrer, a thermometer and a reflux condenser under an argon atmosphere, and the resulting mixture was heated to 80° C. so as to make completely dissolved. 87.8 g (0.493 mol) of N-bromosuccinimide was then added in portion to the flask. The reaction mixture was stirred for 10 hours at 80° C., and then cooled down to room temperature to precipitate white solid, which was filtered, thoroughly washed with methanol, dried and recrystallized from ethyl acetate, to obtain white crystal, which was then filtered and sufficiently dried in a vacuum oven at 40° C. to give 49 g (yield: 63%) of the desired product, and its melting point was 165° C.–166° C.

$^1$H-NMR (CDCl$_3$), δ=3.81(s, 2H, CH$_2$), 7.45–7.63(m, 6H, aromatic)

Example 2

Synthesis of 2,7-dibromo-9-fluorenone [M-2]

47 g (0.145 mol) of [M-1] was dissolved in 600 ml of pyridine in a 1 liter 3-neck round-bottom flask equipped with a stirrer, into which 3.6 ml of triton B was added. The resulting mixture was stirred for four hours while applying oxygen thereto, to give solid. When the reaction was completed, a small amount of acetic acid was added therein, and pyridine was then mostly removed, leaving only a small amount. The reaction mixture was slowly poured into 2 liters of water, to precipitate yellow solid. The solid was filtered, thoroughly washed with water, and then recrystallized from ethyl acetate, to obtain yellow crystal, which was filtered and sufficiently dried in a vacuum oven at 40° C. to give 40 g (yield: 81.6%) of the desired product, and its melting point was 203° C.–205° C.

$^1$H-NMR (CDCl$_3$), δ=7.39–7.42 (d, 2H, aromatic), 7.62–7.69 (d. 2H, aromatic), 7.78 (s, 2H, aromatic)

Example 3

Synthesis of 2,7-dibromo-9,9'-bis(4-hydroxyphenyl) fluorene [M-3]

70 g (0.207 mol) of [M-2], 156 g (1.656 mol) of phenol and 6.48 g (47.6 mmol) of ZnCl$_2$ were put into a 1 litter 3-neck round-bottom flask equipped with a stirrer, and the resulting mixture was heated to 60° C. The reaction mixture was stirred for four hours while applying hydrogen chloride thereinto, to generate solid. After the temperature was cooled down to room temperature, the reaction mixture was slowly poured into 2 liters of hot water to precipitate white solid. The solid was filtered, thoroughly washed with hot water and then dried. The dried solid was recrystallized from a mixture of acetone and toluene to obtain white crystal, which was filtered and sufficiently dried in a vacuum oven at 40° C. to give 86 g (yield: 81.7%) of the desired product, and its melting point was 298° C.–299° C.

$^1$H-NMR (DMSO), δ=6.63–6.67 (d, 4H, aromatic), 6.86–6.90 (d, 4H, aromatic), 7.48–7.58 (t, 4H, aromatic), 7.86–7.90 (d, 2H, aromatic), 9.41 (s, 2H, —OH)

Example 4

Synthesis of 2,7-dibromo-9,9'-bis(4-methoxyphenyl) fluorene [M-4]

300 ml of DMAC, 23 g (0.045 mol) of [M-3], 25.7 g (0.181 mol) of iodomethane and 18.76 g (0.135 mol) of potassium carbonate were put into a 500 ml 3-neck round-bottom flask equipped with a stirrer, a thermometer and a reflux condenser under an argon atmosphere, and the resulting mixture was stirred at 120° C. for 48 hours. When the reaction was completed, the temperature was dropped to room temperature and DMAc was then mostly removed, leaving only a small amount. The reaction mixture was slowly poured into 1 liter of water to precipitate white solid. The solid was filtered, thoroughly washed with water, washed with cold methanol three times and then dried. The dried solid was recrystalized from a mixture of acetone and toluene to obtain white solid, which was filtered and sufficiently dried in a vacuum oven at 40° C. to give 22 g (yield: 90.7%) of the desired product, and its melting point was 202° C.–204° C.

$^1$H-NMR (CDCl$_3$), δ=3.77(s, 6H, —OCH$_3$), 6.75–6.80(d, 4H, aromatic), 7.04–7.10(d, 4H, aromatic), 7.44–7.58(m, 6H, aromatic)

Example 5

Synthesis of 2,7-dibromo-9,9'-bis(4-methoxyphenyl) fluorene [M-5]

20 g (0.037 mol) of [M-4], 0.78 g (1.1 mmol) of bistriphenylphospine palladium dichloride and 0.21 g (1.1 mmol) of copper iodide were dissolved in 500 ml of piperidine in a 1 litter 3-neck flask equipped with a stirrer, a thermometer and a reflux condenser under an argon atmosphere. Into the resulting mixture, 8.38 g (82 mmol) of phenylacetylene was slowly added dropwise at room temperature. The temperature was slowly raised to 80° C. and stirred at the same temperature for 12 hours. When the reaction was completed, the reaction mixture was cooled down to room temperature. Generated salt was filtered off, and the solvent was then removed under a reduced pressure. The residue was dissolved in methylene chloride, and the organic layer was washed with water several times and dried with anhydrous magnesium sulfate, which was then filtered. The solvent was removed to give solid. The solid was recrystallized from a mixture of chloroform and ethanol, to obtain pale yellow crystal, which was sufficiently dried in a vacuum oven at 40° C. to give 19 g (yield: 881%) of the desired product, and its melting point was 195° C.–197° C.

$^1$H-NMR (CDCl$_3$), δ=3.73(s, 6H, —OCH$_3$), 6.74–6.80(d, 4H, aromatic), 7.10–7.16(d, 4H, aromatic), 7.30–7.33(t, 6H, aromatic), 7.48–7.53(m, 8H, aromatic), 7.68–7.71(d, 2H, aromatic)

Example 6

Synthesis of 2,7-bis(phenylglyoxalyl)-9,9'-bis(4-methoxyphenyl)fluorene [M-6]

6 g (0.01 mol) of [M-5] was dissolved in 50 ml of methylene chloride in a 500 ml 2-neck round-bottom flask equipped with a stirrer, into which 100 ml of water was added. Into the resulting mixture, 518 mg of tetrabutylamonium bromide, 2.1 g of sodium bicarbonate and 10.36 g of potassium permanganate were added, and the resulting mixture was stirred for 48 hours. When the reaction was completed, ice bath was installed. 15 g of sodium bisulfate and 8 ml of hydrochloric acid were then slowly added to the mixture, and resultant was stirred for 30 minutes. The reaction mixture was filtered, and the filtrate was extracted with methylene chloride and washed with water several times. Combined extracts was dried with anhydrous magnesium sulfate, and then, the solvent was removed to obtain a yellow liquid. The liquid was recrystallized from toluene/ethanol mixture to obtain yellow crystal, which was sufficiently dried in a vacuum oven at 40° C. to give 5.5 g (yield: 83.3%) of the desired product, and its melting point was 160° C.–162° C.

$^1$H-NMR (CDCl$_3$), δ=3.76(s, 6H, —OCH$_3$), 6.74–6.80(d, 4H, aromatic), 7.08–7.12(d, 4H, aromatic), 7.46–7.54(t, 4H, aromatic), 7.62–7.66(t, 2H, aromatic), 7.90–7.98(d, 8H, aromatic), 8.15(s, 2H, aromatic)

Example 7

Synthesis of 2,7-bis(2,4,5-triphenylcyclopentadienon-3-yl)-9,9'-bis(4-methoxyphenyl)fluorene [M-7]

2 g (3.11 mmol) of [M-6] was put into a 250 ml 2-neck flask equipped with a stirrer, a thermometer and a reflux condenser under an argon atmosphere, into which 70 ml of butanol was added. The resulting mixture was heated to 140° C. so as to be dissolved. After the temperature was dropped to 120° C., 1.63 g (7.77 mmol) of 1,3-diphenylacetone and 0.72 mol of 40% triton B (methanol solution) were added. After the reaction mixture was reacted for 2 hours at 120° C., 0.72 ml of 40% triton B (methanol solution) was added again, and reacted for 4 hours. When the reaction was completed, the temperature was slowly dropped to 0° C. to obtain brown solid. The solid was filtered, washed with cold methanol, and then dissolved in and recrystallized from butanol. The solid was sufficiently dried in a vacuum oven at 40° C. to give 2 g (yield: 66.6%) of the desired product, and its melting point was 141° C.–143° C.

$^1$H-NMR (CDCl$_3$), δ=3.81(s, 6H, —OCH$_3$), 6.43–7.51 (m. 44H, aromatic)

Example 8

Synthesis of 2,7-bis(trimethylsilylethynyl)-9,9'-bis (4-methoxyphenyl) fluorene [M-8]

9.5 g (0.017 mol) of [M-4], 0.5 g (0.7 mmol) of bistriphenylphospine palladium dichloride and 0.21 g (0.7 mmol) of copper iodide were put into a 500 ml 3-neck flask equipped with a stirrer, a thermometer and a reflux condenser under an argon atmosphere, and 200 ml of piperidine was added thereto so as to dissolve the reactants. 6.96 g (0.07 mol) of trimethylsilylacetylene was slowly added dropwise at room temperature. The reaction temperature was slowly raised to 80° C., and the reaction mixture was then stirred at the same temperature for 12 hours. When the reaction was completed, the mixture was cooled down to room temperature. Generated salt was filtered off, and the solvent was then removed under a reduced pressure. The residue was dissolved in methylene chloride, and the organic layer was washed with water several times and then dried with anhydrous magnesium sulfate, which was then removed by filtration. After the solvent was removed, remained solid was recrystallized from a chloroform/ethanol mixture to obtain pale yellow crystal. The crystal was sufficiently dried in a vacuum oven at 40° C. to give 8 g (yield: 79.1%) of the desired product, and its melting point was 243° C.–244° C.

$^1$H-NMR (CDCl$_3$), δ=0.22(s, 18H, —SiCH$_3$), 3.75(s, 6H, —OCH$_3$), 6.73–6.78(d, 4H, aromatic), 7.05–7.09(d, 4H, aromatic), 7.43–7.47(d, 4H, aromatic), 7.62–7.66(d, 2H, aromatic).

Example 9

Synthesis of 2,7-diethynyl-9,9'-bis(4-methoxyphenyl)fluorene [M-9]

6 g (0.01 mol) of [M-8] was dissolved in 150 ml of THF and 150 ml of methanol in a 500 ml round-bottom flask equipped with a stirrer. 40 ml of 1M potassium hydroxide was added, and the resulting mixture was then stirred for 12 hours at room temperature to generate white solid. When the reaction was completed, THF and methanol were removed under a reduced pressure. The residue was dissolved in methylene chloride, and the organic layer was washed with water several times and then dried with anhydrous magnesium sulfate, which was then filtered off. The solvent was removed to obtain solid. The solid was recrystallized from a hexane/ethyl acetate mixture to obtain a pale ivory solid, which was then sufficiently dried in a vacuum oven at 40° C. to give 3 g (yield: 70.4%) of the desired product, and its melting point was 236° C.–238° C.

$^1$H-NMR (CDCl$_3$), δ=3.09(s, 2H, acetylene), 3.75(s, 6H, —OCH$_3$), 6.74–6.80(d, 4H, aromatic), 7.06–7.12(d, 4H, aromatic), 7.50(s, 4H, aromatic), 7.66–7.71(d, 2H, aromatic)

Example 10

Synthesis of bromo fluorene [M-10]

1.2 litters of propylene carbonate and 160 g (0.96 mol) of fluorene were put into a 2 litter 3-neck round-bottom flask equipped with a stirrer, a thermometer and a reflux condenser under an argon atmosphere, and the resulting mixture was heated to 80° C. so as to make completely dissolved. 179.9 g (1.01 mol) of N-bromosuccinimide was added portionwise to the reaction mixture, and the resultant was stirred at 80° C. for 10 hours. The reaction mixture was cooled down to room temperature to precipitate white solid. The solid was filtered, thoroughly washed with methanol, dried and then recrystallized from ethanol, to obtain white crystal, which was filtered and then sufficiently dried in a vacuum oven at 40° C. to give 160 g (yield: 60%) of the desired product, and its melting point was 102° C.–103° C.

$^1$H-NMR (CDCl$_3$), δ=3.87(s, 2H, CH$_2$), 7.31–7.76(m, 7H, aromatic)

Example 11

Synthesis of 2-bromo-9-fluorenone [M-11]

150 g (0.612 mol) of [M-10] was put into a 2 litter 3-neck round-bottom flask equipped with a stirrer and dissolved in 1 litter of pyridine. 15.24 ml of triton B (40% aqueous solution) was added thereto. The resulting mixture was stirred for 4 hours while applying oxygen thereto, to form solid. When the reaction was completed, a small amount of acetic acid was added to the reaction mixture, and pyridine was then mostly removed, leaving only a small amount. The residue was slowly poured into 2 litters of water to precipitate yellow solid. The solid was filtered, thoroughly washed with water and then washed with cold methanol three times. The yellow solid was then dried and recrystallized from ethanol to obtain yellow crystal, which was sufficiently dried in a vacuum oven at 40° C. to give 147 g (yield: 92.7%) of the desired product, and its melting point was 124° C.–126° C.

$^1$H-NMR (CDCl$_3$), δ=7.30–7.80(m, 7H, aromatic)

Example 12

Synthesis of 2-bromo-9,9'-bis(4-hydroxyphenyl)fluorene [M-12]

20 g (0.077 mol) of [M-11], 43.6 g (0.463 mol) of phenol and 2.4 g (0.017 mol) of ZnCl$_2$ were put into a 500 ml 3-neck round-bottom flask equipped with a stirrer. The resulting mixture was heated to 60° C. and then stirred at the same temperature for 4 hours while applying hydrogen chloride thereinto, to form solid. The temperature was dropped to room temperature and the reaction mixture was slowly poured into 2 litters of hot water to precipitate white solid, which was filtered, thoroughly washed with hot water and dried. The dried solid was recrystallized from hexane/ethyl acetate mixture to obtain yellow crystal, which was suffi- ciently dried in a vacuum oven at 40° C. to give 28 g (yield: 84.5%) of the desired product, and its melting point was 250° C.–252° C.

$^1$H-NMR (DMSO), δ=6.63–6.67(d, 4H, aromatic), 6.86–6.90(d, 4H, aromatic), 7.48–7.58(m, 5H, aromatic), 7.86–7.90(d, 2H, aromatic), 9.41(s, 2H, —OH)

Example 13

Synthesis of 2-bromo-9,9'-bis(4-methoxyphenyl)fluorene [M-13]

27 g (0.062 mol) of [M-12], 35.6 g (0.251 mol) of iodomethane and 26 g (0.188 mol) of potassium carbonate were dissolved in 300 ml of DMAc in a 500 ml 3-neck round-bottom flask equipped with a stirrer, a thermometer and a reflux condenser under an argon atmosphere. The resulting mixture was stirred at 120° C. for 48 hours. When the reaction was completed, the temperature was dropped to room temperature and the DMAc was mostly removed, leaving only a small amount. The reaction mixture was slowly poured into 1 litter of water to precipitate white solid, which was filtered, thoroughly washed with water and then dried. The solid was purified by silica gel column chromatography with hexane/ethyl acetate (2:1) mixture to obtain white solid, which was 25 g (yield: 81.7%) of the desired product, and its melting point was 75° C.–77° C.

$^1$H-NMR (CDCl$_3$), δ=3.79(s, 6H, —OCH$_3$), 6.77–6.81(d, 4H, aromatic), 7.09–7.11(d, 4H, aromatic), 7.31–7.75(m, 7H, aromatic)

Example 14

Synthesis of 2-trimethylsilylethynyl-9,9'-bis(4-methoxyphenyl)fluorene [M-14]

23 g (0.05 mol) of [M-13], 0.52 g (0.749 mol) of bis-triphenylphospine paladium dichloride and 0.14 (0.734 mmol) copper iodide were put into a 1 litter 3-neck flask equipped with a stirrer, a thermometer and a reflux condenser under an argon atmosphere, and dissolved in 500 ml of diisopropylamine. 9.87 g (0.1 mol) of trimethylsilylacetylene was slowly added dropwise thereto at room temperature. The temperature of the reaction mixture was slowly raised to 80° C. and then stirred at the same temperature for 12 hours. When the reaction was completed, the reaction mixture was cooled down to room temperature to generate salt, which was filtered off. The solvent was then removed under a reduced pressure. The residue was dissolved in methylene chloride, and the organic layer was washed with water several times and then dried with anhydrous magnesium sulfate, which was then filtered off. The solvent was removed to obtain solid, which was purified by silica gel column chromatography with hexane/ethyl acetate (3:1) mixture to obtain 20 g (yield: 83.8%) of the desired product as white solid, and its melting point was 104° C.–106° C.

$^1$H-NMR (CDCl$_3$), δ=0.26(s, 9H, —SiCH$_3$), 3.80(s, 6H, —OCH$_3$), 6.78–6.81(d, 4H, aromatic), 7.11–7.13(d, 4H, aromatic), 7.31–7.76(m, 7H, aromatic)

Example 15

Synthesis of 2-ethynyl-9,9'-bis(4-methoxyphenyl)fluorene [M-15]

24 g (0.05 mol) of [M-14] was put into a 1 litter round-bottom flask equipped with a stirrer and dissolved in 200 ml of THF and 300 ml of methanol. 100 ml of 1M potassium hydroxide was then added thereto, and the resulting mixture was stirred for 12 hours at room temperature, to form white solid. When the reaction was completed, THF and methanol were removed under a reduced pressure, and the residue was extracted with methylene chloride. Organic layer was washed with water several times and then dried with anhydrous magnesium sulfate, which was then filtered off. The solvent was removed to obtain viscous solid, which was purified by silica gel column chromatography with methylene chloride as an eluent, to give 17.8 g (yield: 88.6%) of the desired product as white solid, and its melting point was not observed.

$^1$H-NMR (CDCl$_3$), δ=3.06(s, 1H, -acetylene), 3.75(s, 6H, —OCH$_3$), 6.74–6.78(d, 4H, aromatic), 7.07–7.11(d, 4H, aromatic), 7.31–7.76(m, 7H, aromatic)

Example 16

Synthesis of 2,7-dibromo-9-(2'-biphenyl)-9'-hydroxyfluorene [M-16]

30 g (0.128 mol) of 2-bromobiphenyl and 6.25 g (0.257 mol) of magnesium tuning were put into a 500 ml 3-neck flask equipped with a stirrer, a thermometer and a reflux condenser under an argon atmosphere, into which 300 ml of anhydrous ether was added and then a small amount of iodine was added. The temperature of the reaction mixture was raised to 50° C. and refluxed for 4 hours, to obtain Grignard reagent. 39.1 g of [M-2] was dissolved in 300 ml of anhydrous ether in a separate reactor equipped with a stirrer, a thermometer and a reflux condenser under an argon atmosphere, and its temperature was raised to 50° C., and the reaction mixture was refluxed. The Grignard reagent prepared as described above was slowly added dropwise thereto, and the resultant was refluxed for 12 hours. When the reaction was completed, the temperature was dropped to room temperature to precipitate solid, which was filtered, thoroughly washed with ether and then poured into a saturated ammonium chloride solution. The resultant was then stirred for 10 hours, to obtain a pale yellow solid, which was filtered, thoroughly washed with water, dried and then recrystallized from ethanol to obtain pale yellow crystal. The crystal was sufficiently dried in a vacuum oven at 40° C. to give 46 g (yield: 72.6%) of the desired product, and its melting point was 213° C.–215° C.

$^1$H-NMR (CDCl$_3$), δ=6.06–6.09(d, 2H, aromatic), 6.63–6.70(t, 2H, aromatic), 6.80–6.99(m, 3H, aromatic), 7.29–7.38(m, 6H, aromatic), 7.48–7.58(t, 2H, aromatic), 8.36–8.41 (d, 1H, —OH)

Example 17

Synthesis of 2,7-dibromo-9,9'-spirobifluorene [M-17]

45 g (0.091 mol) of [M-16] was added to 700 ml of acetic acid in a 1 litter 3-neck flask equipped with a stirrer, a thermometer and a reflux condenser, and then dissolved by raising the temperature to 120° C. After 2 ml of concentrated hydrochloric acid was added thereto, and the resulting mixture was refluxed for 4 hours. When the temperature was dropped to room temperature, solid was precipitated. The solid was filtered, thoroughly washed with water, dried and then recrystallized from a chloroform/ethanol mixture, to obtain pale yellow crystal, which was sufficiently dried in a vacuum oven at 40° C. to give 35 g (yield: 80.8%) of the desired product, and its melting point was 340° C.–341° C.

$^1$H-NMR (CDCl$_3$), δ=6.68–6.72(d, 2H, aromatic), 6.81–6.82(d, 2H, aromatic), 7.09–7.16(m, 2H, aromatic), 7.34–7.49(m, 4H, aromatic), 7.62–7.67(d, 2H, aromatic), 7.81–7.84(d, 2H, aromatic)

Example 18

Synthesis of 2,7-bis(trimethylsilylethynyl)-9,9'-spirobifluorene [M-18]

10 g (20.4 mmol) of [M-17], 0.43 g (0.625 mmol) of bistriphenylphospine palladium dichloride and 0.12 g (0.625 mmol) of copper iodide were put into a 500 ml 3-neck flask equipped with a stirrer, a thermometer and a reflux condenser under an argon atmosphere, and dissolved in 300 ml of piperidine. 8 g (81.6 mmol) of trimethylsilylacetylene was slowly added dropwise thereto at room temperature. After completion of the addition, the reaction temperature was slowly raised to 80° C. and the reaction mixture was stirred at the same temperature for 12 hours. When the reaction was completed, the reaction mixture was cooled down to room temperature, and generated salt was filtered off and the solvent was then removed under a reduced pressure. The residue was dissolved in methylene chloride, and the organic layer was washed with water several times and dried with anhydrous magnesium sulfate, which was then filtered off. After the solvent was removed, the solid was recrystallized from a chloroform/ethanol mixture, to obtain pale yellow crystal, which was sufficiently dried in a vacuum oven at 40° C. to give 7.2 g (yield: 67.2%) of the desired product, and its melting point was 267° C.–269° C.

$^1$H-NMR (CDCl$_3$), δ=0.15(s, 18H, —SiCH$_3$), 6.67–6.71 (d, 2H, aromatic), 6.82(s, 2H, aromatic), 7.11–7.12(t, 2H, aromatic), 7.38–7.50(m, 4H, aromatic), 7.72–7.76(d, 2H, aromatic), 7.83–7.86(d, 2H, aromatic)

Example 19

Synthesis of 2,7-diethynyl-9,9'-spirobifluorene [M-19]

7.2 g (13.7 mmol) of [M-18] was put into a 500 ml of round-bottom flask equipped with a stirrer, and dissolved in 100 ml of THF and 100 ml of methanol. 20 ml of 20% potassium hydroxide was added thereto, and the resulting mixture as then stirred for 12 hours at room temperature to generate solid. When the reaction was completed, THF was mostly removed, leaving a small amount. Into the residue, 100 ml of methanol was added, and the precipitated solid was filtered and then thoroughly washed with methanol. The solid was then dissolved in chloroform, and the organic layer was washed with water several times and then dried with anhydrous magnesium sulfate, which was then filtered off. The solvent was removed to obtain yellow solid, which was sufficiently dried in a vacuum oven at 40° C. to give 4.2 g (yield: 84%) of the desired product, and its melting point was not observed.

$^1$H-NMR (CDCl$_3$), δ=2.89(s, 2H, acetylene), 6.61–6.65 (d, 2H, aromatic), 6.79(s, 2H, aromatic), 7.01–7.08(t, 2H, aromatic), 7.26–7.34(t, 2H, aromatic), 7.41–7.45(d, 2H, aromatic), 7.68–7.79(t, 4H, aromatic)

Example 20

Synthesis of 2-bromo-9-(2'biphenyl)-9'-hydroxyfluorene [M-20]

35 g (0.15 mol) of 2-bromobiphenyl and 5.47 g (0.225 mol) of magnesium tuning were put into a 500 ml 3-neck flask equipped with a stirrer, a thermometer and a reflux condenser under an argon atmosphere, into which 300 ml of anhydrous ether was added and then a small amount of iodine was added. The temperature of the reaction mixture was raised to 50° C. and refluxed for 4 hours, to obtain Grignard reagent. 35 g of [M-11] was put into 300 ml of anhydrous ether in a 1 liter 3-neck flask equipped with a stirrer, a thermometer and a reflux condenser under an argon atmosphere, and its temperature was raised to 50° C. for refluxing the resulting solution, into which the Grignard reagent obtained as described above was slowly added dropwise, and the resulting mixture was refluxed for 12 hours. When the reaction was completed, the temperature was dropped to room temperature to precipitate solid, which was filtered, thoroughly washed with ether and poured into a saturated ammonium chloride solution. The resultant was stirred for 10 hours, to obtain white solid. This solid was filtered, thoroughly washed with water, dried and then recrystallized from ethanol to obtain white crystal, which was sufficiently dried in a vacuum oven at 40° C. to give 51 g (yield: 82.2%) of the desired product, and its melting point was 167° C.–168° C.

$^1$H-NMR (CDCl$_3$), δ=5.92–5.96(d, 1H, aromatic), 6.10–6.13(d, 1H, aromatic), 6.58–6.71(m, 2H, aromatic) 6.79–7.00(m, 3H, aromatic), 7.10–7.37(m, 8H, aromatic), 7.49–7.57(t, 1H, aromatic), 8.40–8.44(d, 1H, —OH)

Example 21

Synthesis of 2-bromo-9,9'-spirobifluorene [M-21]

50 g (0.121 mol) of [M-20] and 500 ml of acetic acid were put into a 1 liter 3-neck flask equipped with a stirrer, a thermometer and a reflux condenser, and dissolved by raising the temperature to 120° C. 2 ml of concentrated hydrochloric acid was put into the reaction mixture and the resultant was refluxed for 4 hours. After the completion of the reaction, the temperature was dropped to room temperature, and then solid was precipitated. This solid was filtered, thoroughly washed with water, dried and then recrystallized from a chloroform/ethanol mixture to obtain white crystal, which was sufficiently dried in a vacuum oven at 40° C. to give 30 g (yield: 62.8%) of the desired product, and its melting point was 186° C.–188° C.

$^1$H-NMR (CDCl$_3$), δ=6.70–6.74(d, 3H, aromatic), 6.84(s, 1H, aromatic), 7.08–7.16(t, 3H, aromatic), 7.32–7.50(m, 4H, aromatic), 7.68–7.72(d, 1H, aromatic), 7.78–7.86(t, 3H, aromatic)

Example 22

Synthesis of 2-trimethylsilylethynyl-9,9'-spirobifluorene [M-22]

20 g (0.05 mol) of [M-21], 1.06 g (1.515 mmol) of bistriphenylphospine palladium dichloride and 0.29 (1.515 mmol) copper iodide were put into a 500 ml 3-neck round-bottom flask equipped with a stirrer, a thermometer and a reflux condenser under an argon atmosphere, and dissolved in 400 ml of diisopropylamine, into which 7.45 g (75.89 mmol) of trimethylsilylacetylene was slowly added dropwise at 80° C. After the addition, the resulting mixture was stirred at 80° C. for 12 hours. When the reaction was completed, the temperature was cooled down to room temperature, generated salt was filtered off, and then the solvent was removed under a reduced pressure. The residue was dissolved in methylene chloride, and the organic layer was washed with water several times, and dried with anhydrous magnesium sulfate, which was then filtered off. The solvent was removed, and the residue was recrystallized from a chloroform/hexane mixture to obtain white crystal, which was sufficiently dried in a vacuum oven at 40° C. to give 17 g (yield: 81.7%) of the desired product, and its melting point was 205° C.–206° C.

$^1$H-NMR (CDCl$_3$), δ=0.15(S, 9H, —SiCH$_3$), 6.69–6.73 (d, 3H, aromatic), 6.84(s, 1H, aromatic), 7.10–7.15(t, 3H, aromatic), 7.33–7.42(t, 3H, aromatic), 7.46–7.51(d, 1H, aromatic), 7.74–7.87(m, 4H, aromatic)

Example 23

Synthesis of 2-ethynyl-9,9'-spirobifluorene [M-23]

14 g (0.034 mol) of [M-22] was put into a 500 ml of round-bottom flask equipped with a stirrer, and then dissolved in 200 ml of THF and 200 ml of methanol. 70 ml of 1M potassium hydroxide was added thereto, and the resulting mixture was stirred at room temperature for 12 hours. When the reaction was completed, THF and methanol were removed under a reduced pressure. Chloroform was added to the residue, thereby to extract organic components. The organic layer was washed with water several times and then dried with anhydrous magnesium sulfate, which was filtered off. The solvent was removed to obtain solid. This solid was recrystallized from a chloroform/ethanol mixture to obtain pale yellow crystal, which was sufficiently dried in a vacuum oven at 40° C. to give 7.7 g (yield: 69.5%) of the desired product, and its melting point was 169° C.–170° C.

$^1$H-NMR (CDCl$_3$), δ=2.93(s, 1H, acetylene), 6.68–6.74 (q, 3H, aromatic), 6.85(s, 1H, aromatic), 7.05–7.14(t, 3H, aromatic), 7.31–7.39(t, 3H, aromatic), 7.46–7.50(d, 1H, aromatic), 7.75–7.84(t, 4H, aromatic)

Example 24

Synthesis of 4,4'-dibromostilbene [M-24]

47 g (0.188 mol) of 4-bromobenzylbromide and 37.5 g (0.224 mol) of check triethylphosphite were put into a 500 ml 3-neck round-bottom flask equipped with a stirrer, a thermometer and a reflux condenser under an argon atmosphere, and the resulting mixture was stirred at 150° C. for 4 hours. The temperature was dropped to room temperature, and 250 ml of anhydrous DMF was added. After an ice bath was installed, 11.28 g (0.282 mol) of sodium hydride (60%) was slowly added and the resultant was stirred for 30 minutes. After 33.7 g (0.182 mol) of 4-bromobenzaldehyde was slowly added, ice bath was removed, and then the reaction mixture was stirred at room temperature for 12 hours. The reaction mixture was poured into cold water to give solid. This solid was filtered, thoroughly washed with water and methanol, dried and then recrystallized, to obtain white crystal, which was sufficiently dried in a vacuum oven at 40° C. to give 40 g (yield: 63%) of the desired product, and its melting point was 212° C.–213° C.

$^1$H-NMR (CDCl$_3$), δ=7.03(s, 2H, vinyl), 7.35–7.39(d, 4H, aromatic), 7.47–7.51(d, 4H, aromatic)

Example 25

Synthesis of 4,4'-bis(trimethylsilylethynyl)stilbene [M-25]

20 g (0.059 mol) of [M-24], 1.24 g (1.77 mmol) of bistriphenylphospine palladium dichloride and 0.33 g (1.77 mmol) of copper iodide were added to 300 ml of piperidine in a 500 ml 3-neck round-bottom flask equipped with a stirrer, a thermometer and a reflux condenser under an argon atmosphere, and then dissolved by raising the temperature to 100° C. After the temperature was dropped to 80° C., 23.2 g (0.236 mol) of trimethylsilylacetylene was slowly added dropwise, and the resulting mixture was then stirred at 80° C. for 12 hours. When the reaction was completed, the reaction mixture was cooled down to room temperature, and generated salt was filtered off. The solvent was removed under a reduced pressure, and then the residue was dissolved in a chloroform, washed with water several times and dried with anhydrous magnesium sulfate, which was then filtered off. The solvent was removed, and the residue was washed with ethyl acetate to obtain pale yellow crystal. This solid was recrystallized from chloroform/ethanol mixture to obtain pale yellow crystal, which was sufficiently dried in a vacuum oven at 40° C. to give 16 g (yield: 72.7%) of the desired product, and its melting point was 207° C.–208° C.

$^1$H-NMR (CDCl$_3$), δ=0.26(s, 18H, —SiCH$_3$), 7.09(s, 2H, 비닐), 7.45(s, 8H, aromatic)

Example 26

Synthesis of 4.4'-diethynylstilbene [M-26]

15 g (0.04 mol) of [M-25] was put into a 1 litter round-bottom flask equipped with a stirrer, and dissolved in 300 ml of THF and 600 ml of methanol. 100 ml of 1M potassium hydroxide was added, and the resulting mixture was stirred for at room temperature 12 hours to form solid. When the reaction was completed, THF was mostly removed, leaving only a small amount. 100 ml of methanol was additionally to the residue, and then precipitated solid was filtered, thoroughly washed with water and methanol, and then sufficiently dried in a vacuum oven at 40° C. to give 8 g (yield: 87.6%) of the desired product, and its melting point was not observed.

$^1$H-NMR (CDCl$_3$), δ=3.13(s, 2H, acetylene), 7.08(s, 2H, vinyl), 7.46(s, 8H, aromatic)

Example 27

Synthesis of 1,4-bis(phenylethynyl)-2,5-dimethoxybenzene [M-27]

50 g (160 mmol) of 1,4-dibromo-2,5-dimethoxy benzene, 3.6 g (0.005 mol) of bistriphenylphosphine palladium dichloride and 0.97 g (0.005 mol) of copper iodide were put into a 1 litter 3-neck flask equipped with a stirrer, a thermometer and a reflux condenser under an argon atmosphere, and dissolved in 500 ml of piperidine. 43 g (0.422 mol) of phenylacetylene was then slowly added dropwise at room temperature. The reaction temperature was slowly raised to 80° C. and then the reaction mixture was stirred at the same temperature for 12 hours. When the reaction was completed, the reaction mixture was cooled down to room temperature, and then generated salt was filtered off. The solvent was removed under a reduced pressure, and then the residue was extracted with methylene chloride. Organic layer was washed with water several times and dried with anhydrous magnesium sulfate, and then the solvent was removed to obtain yellow solid. This solid was recrystallized from ethyl acetate to obtain yellow crystal, which was sufficiently dried in a vacuum oven at 40° C. to give 41 g (yield: 72%) of the desired product, and its melting point was 172° C.–174° C.

$^1$H-NMR (CDCl$_3$), δ=3.91(s, 6H, —OCH$_3$), 7.04(s, 2H, aromatic), 7.25–7.37(d, 6H, aromatic), 7.55–7.58(d, 4H, aromatic)

Example 28

Synthesis of 1,4-bis(phenylglyoxalyl)-2,5-dimethoxybenzene [M-28]

11.6 g (0.034 mol) of [M-27] was put into a 1 litter 3-neck round-bottom flask equipped with a stirrer, and dissolved in 170 ml of methylene chloride, and then 340 m of water was added. 1.7 g of tetrabutylammonium bromide, 6.8 g of sodium bicarbonate and 34 g of potassium permanganate were added, and the resulting mixture was stirred for 48 hours. When the reaction was completed, an ice bath was installed, and then 51 g of sodium bisulfite and 26 ml of hydrochloric acid were slowly added to the reaction mixture, the resultant was stirred for 30 minutse. After the reaction mixture was filtered, the filtrate was extracted with methylene chloride. Combined extracts were then washed with water several times and dried with anhydrous magnesium sulfate. The solvent was removed to obtain yellow solid. This solid was recrystallized from an ethyl acetate solvent to obtain yellow crystal, which was sufficiently dried in a vacuum oven at 40° C. to give 9 g (yield: 61%) of the desired product, and its melting point was 209° C.–211° C.

$^1$H-NMR (CDCl$_3$), δ=3.61(s, 6H, —OCH$_3$), 7.50–7.68 (m, 8H, aromatic), 7.91–7.95(d, 4H, aromatic)

Example 29

Synthesis of 1,4-bis(2,4,5-triphenylcyclopentadienon-3-yl)-2,5-dimethoxybenzene [M-29]

9 g (22.3 mmol) of [M-28] was added to 300 ml of butanol in a 500 ml 2-neck flask equipped with a stirrer, a thermometer and a reflux condenser under an argon atmosphere, and the resulting mixture was heated to 120° C. so as to be dissolved. 11.7 g (56 mmol) of 1,3-diphenylacetone and 5.1 ml of 40% triton B (methanol solution) were added. The reaction mixture was reacted at 120° C. for 2 hours, and then 5.1 ml of 40% triton B (methanol solution) was added again, and the reaction mixture was additionally reacted for end-capping for 4 hours. When the reaction was completed, the temperature was slowly dropped to 0° C. to obtain a dark brown solid. This solid was filtered, washed with cold ethanol, filtered again, and sufficiently dried in a vacuum oven at 40° C. to give 10 g (yield: 60%) of the desired product, and its melting point was 318° C.–321° C.

$^1$H-NMR (CDCl$_3$), δ=2.81(s, 6H, —OCH$_3$), 6.33(s, 2H, aromatic), 6.98(br, 4H, aromatic), 7.23–7.26(m, 24H, aromatic)

Example 30

Synthesis of 1,4-bis(trimethylsilylethynyl)-2,5-dimethoxybenzene [M-30]

100 g (0.338 mol) of 1,4-dibromo-2,5-dimethoxybenzene, 7.12 g (0.01 mol) of bistriphenylphospine palladium dichloride and 1.93 g (0.01 mol) of copper iodide were put into a 1 litter 3-neck round-bottom flask equipped with a stirrer, a thermometer and a reflux condenser under an argon atmosphere, and dissolved in 600 ml of diisopropylamine. 99 g (1 mol) of trimethylsilylacetylene was then slowly added dropwise at room temperature, and stirred at 80° C. for 12 hours. When the reaction was completed, the reaction mixture was cooled down to room temperature, generated salt was filtered off, and then the solvent was removed under a reduced pressure. The residue was dissolved in chloroform, and resultant was washed with water several times and then dried with anhydrous magnesium sulfate, which was then filtered off. The solvent was removed, and the residue was recrystallized from ethyl acetate/hexane mixture to obtain pale yellow crystal, which was sufficiently dried in a vacuum oven at 40° C. to give 82.5 g (yield: 73%) of the desired product, and its melting point was 164° C.–165° C.

$^1$H-NMR (CDCl$_3$), δ=0.25(s, 18H, —SiCH$_3$), 3.82(s, 6H, —OCH$_3$), 7.90(s, 2H, aromatic)

Example 31

Synthesis of 1,4-dienyl-2,5'-dimethoxybenzene [M-31]

35 g (0.1 mol) of [M-30] was put into a 1 litter round-bottom flask equipped with a stirrer and dissolved in 500 ml of THF and 250 ml of methanol. 100 ml of 20% potassium hydroxide was added, and the resulting mixture was stirred at room temperature for 12 hours. When the reaction was completed, the solvent was removed under a reduced pressure. The residue was dissolved in methylene chloride, and the resultant was washed with water several times and then dried with anhydrous magnesium sulfate, which was then filtered off. After the solvent was removed, the residue was recrystallized from toluene to obtain yellow crystal, which was sufficiently dried in a vacuum oven at 40° C. to give 13.4 g (yield: 72%) of the desired product, and its melting point was 158° C.–160° C.

$^1$H-NMR (CDCl$_3$), δ=3.41(s, 2H, acetylene), 3.87(s, 6H, —OCH$_3$), 6.99(s, 2H, aromatic)

Synthesis of Polymers

Example 32

Polymerization of 2,7-bis(2,4,5-triphenylcyclopenta-dienon-3-yl)-9,9'-dihexylfluorene with the monomer [M-19] [P-1]

0.6 g (0.633 mmol) of 2,7-bis(2,4,5-triphenylcyclopenta-dienon-3-yl)-9,9'-dihexylfluorene and 0.23 g (0.633 mmol) of the monomer [M-19] were put into a 50 ml ample flask equipped with a stirrer and a thermometer, into which 3.16 ml (0.4 mol/L) of cyclohexylbenzene was added. The resulting mixture was degassed by a freeze-pump-thaw technique with a pump, and argon was injected thereinto. The ample was then sealed and the reaction was carried out at 200° C. for 48 hours. When the reaction was completed, the temperature was dropped to room temperature, and the ample was opened. 36 mg of p-tolylacetylene was added into the ample, which was then sealed and reacted again for end-capping at 170° C. for 5 hours. The temperature was dropped to room temperature, the ample was opened, toluene was added so as to dilute the reaction mixture the reaction mixture, and then the resultant was precipitated in methanol to give yellow polymer. This polymer was filtered, dried and then dissolved in chloroform. Activated carbon was added and the resultant was stirred for 5 hours. After filtering activated carbon, the polymer was re-precipitated in methanol, to obtain pale yellow polymer, which was sufficiently dried in a vacuum oven at 40° C. to give 0.52 g (yield: 65.5%) of the desired product. A maximum ultraviolet absorption wavelength of the polymer was 334 nm and a maximum light-emitting wavelength of the polymer was 386 nm in chloroform.

Example 33

Polymerization Monomers [M-7] with the Monomer [M-19] [P-2]

0.6 g (0.605 mmol) of the monomer [M-7] and 0.22 g (0.605 mmol) of the monomer [M-19] were put into a 50 ml ample flask equipped with a stirrer and a thermometer, into which 4 ml (0.3 mol/L) of cyclohexylbenzene was added. The resulting mixture was degassed by a freeze-pump-thaw technique with a pump, and argon was injected thereinto. The ample was then sealed, and the resulting mixture was reacted at 200° C. for 48 hours. When the reaction was completed, the temperature was dropped to room temperature, and then the ample was opened. 36 mg of p-tolylacetylene was added, and then the ample was sealed again. The resultant was additionally reacted for end-capping for end-capping at 170° C. for 5 hours. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.4 g (yield: 50.8%) of the desired polymer. A maximum ultraviolet absorption wavelength of the polymer was 328 nm and a maximum light-emitting wavelength of the polymer was 490 nm in chloroform.

Example 34

Polymerization of 2,7-bis(2,4,5-triphenylcyclopenta-dienon-3-yl)-9,9'-dihexylfluorene with 4,4'-diethynyl-(4"-methyl)triphenylamine [P-3]

0.641 g (0.676 mmol) of 2,7-bis(2,4,5-triphenylcyclopen-tadienon-3-yl)-9,9'-di-n-hexylfluorene and 0.208 g (0.676 mmol) of 4,4'-diethynyl-(4"-methyl)triphenylamine were put into a 50 ml ample flask equipped with a stirrer and a thermometer, into which 2.7 ml (0.5 mol/L) of cyclohexylbenzene was added. The resulting mixture was degassed by a freeze-pump-thaw technique with a pump, and argon was injected thereinto. The ample was then sealed, and the resulting mixture was reacted at 200° C. for 48 hours. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.44 g (yield: 54.3%) of the desired polymer. A maximum ultraviolet absorption wavelength of the polymer was 332 nm and a maximum light-emitting wavelength of the polymer was 421 nm in chloroform.

Example 35

Polymerization of 2,7-bis(2,4,5-triphenylcyclopentadienon-3-yl)-9,9'-dihexylfluorene with [M-31] [P4]

0.6 g (0.633 mmol) of 2,7-bis(2,4,5-triphenylcyclopentadienon-3-yl)-9,9'-di-n-hexylfluorene and 0.118 g (0.633 mmol) of the monomer [M-31] were put into a 50 ml ample flask equipped with a stirrer and a thermometer, into which 2.53 ml (0.5 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.32 g (yield: 46.9%) of the desired polymer. A maximum ultraviolet absorption wavelength of the polymer was 332 nm and a maximum light-emitting wavelength of the polymer was 398 nm in chloroform.

Example 36

Copolymerization of 2,7-bis(2,4,5-triphenylcyclopentadienon-3-yl)-9,9'-dihexylfluorene, 2,7-diethynyl-9,9'-di-n-hexylfluorene and the monomer [M-26] [P-5]

0.6 g (0.633 mmol) of 2,7-bis(2,4,5-triphenylcyclopentadienon-3-yl)-9,9'-di-n-hexylfluorene, 0.193 g (0.506 mmol) of 2,7-diethynyl-9,9'-di-n-hexylfluorene and 28.9 mg (0.126 mmol) of the monomer [M-26] were put into a 50 ml ample flask equipped with a stirrer and a thermometer, into which 4.2 ml (0.3 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.46 g (yield: 57.7%) of the desired polymer. A maximum ultraviolet absorption wavelength of the resultant polymer was 332 nm and a maximum light-emitting wavelength of the polymer was 403 nm in chloroform.

Example 37

Copolymerization of 2,7-bis(2,4,5-triphenylcyclopentadienon-3-yl)-9,9'-dihexylfluorene, the monomer [M-19] and the monomer [M-26] [P6]

0.6 g (0.633 mmol) of 2,7-bis(2,4,5-triphenylcyclopentadienon-3-yl)-9,9'-di-n-hexylfluorene, 0.184 g (0.506 mmol) of the monomer [M-19] and 28.9 mg (0.126 mmol) of the monomer [M-26] were put into a 50 ml ample flask equipped with a stirrer and a thermometer, into which 4.2 ml (0.3 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping at 170° C. for 5 hours. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.47 g (yield: 59.7%) of the desired polymer. A maximum ultraviolet absorption wavelength of the resultant polymer was 334 nm and a maximum light-emitting wavelength of the polymer was 403 nm in chloroform.

Example 38

Copolymerization of the monomer [M-7], 2,7-diethynyl-9,9'-di-n-hexylfluorene and the monomer [M-26] [P-7]

0.6 g (0.605 mmol) of the monomer [M-7], 0.185 g (0.484 mmol) of 2,7-diethynyl-9,9'-di-n-hexylfluorene and 27.6 mg (0.121 mmol) of the monomer [M-26] were put into a 50 ml ample flask equipped with a stirrer and a thermometer, into which 4 ml (0.3 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.39 g (yield: 50.2%) of the desired polymer. A maximum ultraviolet absorption wavelength of the resultant polymer was 328 nm and a maximum light-emitting wavelength of the polymer was 492 nm in chloroform.

Example 39

Polymerization of the monomer [M-7] with 4,4'-diethynyl-(4"-methyl)triphenylamine [P-8]

0.596 g (0.601 mmol) of the monomer [M-7] and 0.185 g (0.601 mmol) of 4,4'-diethynyl-(4"-methyl)triphenylamine were put into a 50 ml ample flask equipped with a stirrer and a thermometer, into which 2.4 ml (0.5 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.39 g (yield: 52.2%) of the desired polymer. A maximum ultraviolet absorption wavelength of the resultant polymer was 322 nm and a maximum light-emitting wavelength of the polymer was 490 nm in chloroform.

Example 40

Polymerization of the Monomer [M-7] with the Monomer [M-31] [P-9]

0.6 g (0.605 mmol) of the monomer [M-7] and 0.112 g (0.605 mmol) of the monomer [M-31] were put into a 50 ml ample flask equipped with a stirrer and a thermometer, into which 2.42 ml (0.5 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in methanol to give yellow polymer. This polymer was filtered, dried and then dissolved in chloroform. Activated carbon was added, and the resultant was stirred for 5 hours. After filtering off the activated carbon, the resultant was re-precipitated in methanol to obtain pale yellow polymer, which was sufficiently dried in a vacuum oven at 40° C. to give 0.45 g (yield: 66.3%) of the desired polymer. A maximum ultraviolet absorption wavelength of the resultant polymer was 324 nm and a maximum light-emitting wavelength of the polymer was 490 nm in chloroform.

Example 41

Polymerization of the monomer [M-29] with 2,7-diethynyl-9,9'-di-n-hexylfluorene [P-10]

1 g (1.33 mmol) of the monomer [M-29] and 0.51 g (1.33 mmol) of 2,7-diethynyl-9,9'-di-n-hexylfluorene were put into a 50 ml ample flask equipped with a stirrer and a thermometer, into which 3.8 ml (0.7 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in acetone/hexane (200 ml/600 ml) to obtain yellow polymer. This polymer was filtered, dried and then dissolved in chloroform. Activated carbon was added, and the resultant was stirred for 5 hours. After filtering off the activated carbon, the resultant was re-precipitated in acetone/hexane (200 ml/600 ml) to obtain pale yellow polymer, which was sufficiently dried in a vacuum oven at 40° C. to give 0.95 g (yield: 63%) of the desired polymer. A maximum ultraviolet absorption wavelength of the resultant polymer was 330 nm and a maximum light-emitting wavelength of the polymer was 404 nm in chloroform.

Example 42

Polymerization of the Monomer [M-29] with the Monomer [M-19] [P-11]

0.5 g (0.665 mmol) of the monomer [M-29] and 0.24 g (0.665 mmol) of the monomer [M-19] were put into a 50 ml ample flask equipped with a stirrer and a thermometer, into which 4.44 ml (0.3 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 36 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in acetone/hexane (200 ml/600 ml) to obtain yellow polymer. This polymer was filtered, dried and then dissolved in chloroform. Activated carbon was added, and the resultant was stirred for 5 hours. After filtering off the activated carbon, the resultant was re-precipitated in acetone/hexane (200 ml/600 mL) to obtain pale yellow polymer, which was sufficiently dried in a vacuum oven at 40° C. to give 0.56 g (yield: 75%) of the desired polymer. A maximum ultraviolet absorption wavelength of the resultant polymer was 334 nm and a maximum light-emitting wavelength of the polymer was 408 nm in chloroform.

Example 43

Polymerization of the Monomer [M-29] with the Monomer [M-5] [P-12]

0.5 g (0.665 mmol) of the monomer [M-29] and 0.385 g (0.665 mmol) of the monomer [M-5] were put into a 50 ml ample flask equipped with a stirrer and a thermometer, into which 4.44 ml (0.3 mol/L) of benzophenone was added. The resulting mixture was degassed by a freeze-pump-thaw technique with a pump, and argon was injected thereinto. The ample was then sealed, and the resulting mixture was reacted for 48 hours at 280° C. When the reaction was completed, the temperature was dropped to room temperature, and then the ample was opened. 50 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in acetone/hexane (200 ml/600 mL) to obtain yellow polymer. This polymer was filtered, dried and then dissolved in chloroform. Activated carbon was added, and the resultant was stirred for 5 hours. After filtering off the activated carbon, the resultant was re-precipitated in acetone/hexane (200 ml/600 mL) to obtain pale yellow polymer, which was sufficiently dried in a vacuum oven at 40° C. to give 0.57 g (yield: 71%) of the desired polymer. A maximum ultraviolet absorption wavelength of the resultant polymer was 330 nm and a maximum light-emitting wavelength of the polymer was 398 nm in chloroform.

Example 44

Polymerization of the Monomer [M-29] with the Monomer [M-31] [P-13]

0.5 g (0.665 mmol) of the monomer [M-29] and 0.124 g (0.665 mmol) of the monomer [M-31] were put into a 50 ml ample flask equipped with a stirrer and a thermometer, into which 4.44 ml (0.3 mol/L) of cyclohexylbenzene was added. The resulting mixture was degassed by a freeze-pump-thaw technique with a pump, and argon was injected thereinto. The ample was then sealed, and the resulting mixture was reacted for 48 hours at 200° C. When the reaction was completed, the temperature was dropped to room temperature, and then the ample was opened. 50 mg of p-tolylacetylene was added, and then the ample was sealed again. The resultant was additionally reacted for end-capping for 5 hours at 170° C. The temperature was dropped to room temperature, the ample was opened, toluene was added so as to dilute the reaction mixture, and then the resultant was precipitated in acetone/hexane (200 ml/600 ml) to obtain yellow polymer. This polymer was filtered, dried and then dissolved in chloroform. Activated carbon was added, and the resultant was stirred for 5 hours. After filtering off the activated carbon, the resultant was re-precipitated in acetone/hexane (200 ml/600 ml) to obtain pale yellow polymer, which was sufficiently dried in a vacuum oven at 40° C. to give 0.45 g (yield: 73%) of the desired polymer. A maximum ultraviolet absorption wavelength of the resultant polymer was 330 nm and a maximum light-emitting wavelength of the polymer was 404 nm in chloroform.

Example 45

Structure Analysis, and UV, PL and EL Properties

Figure 2:
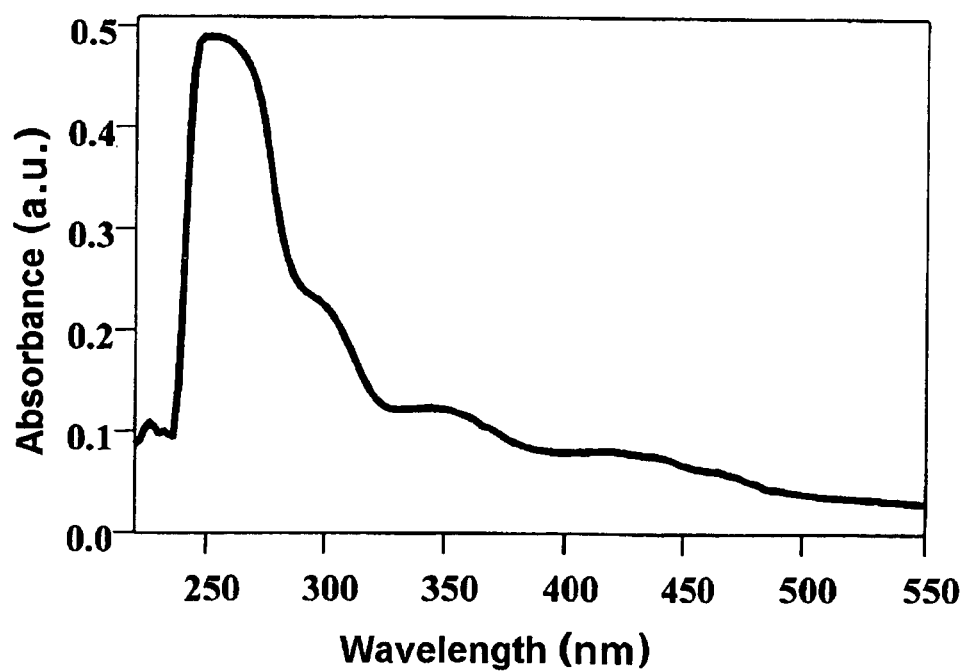
FIG. 2 shows UV-Vis spectrum of the monomer M-29 of Example 29.
Figure 3:
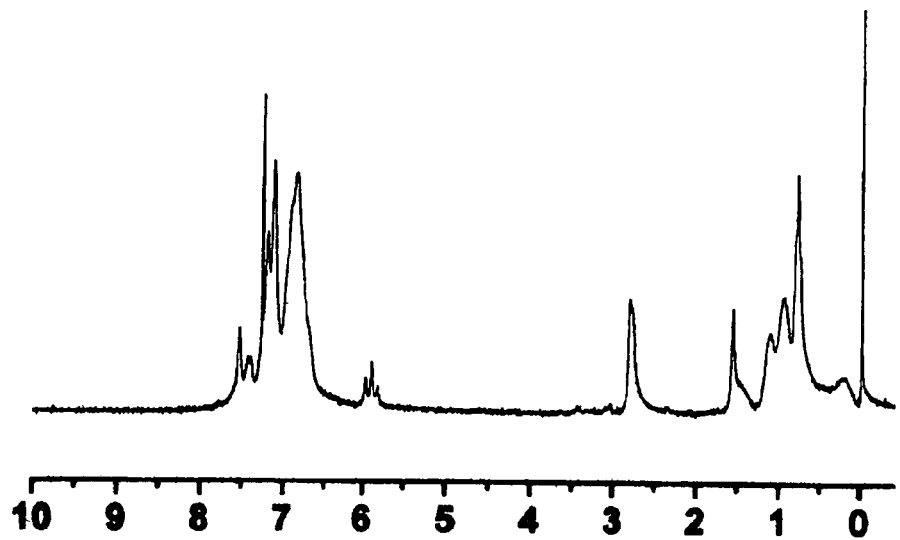
FIG. 3 shows $^1$H NMR spectra of the polymer P-10 of Example 41.
Figure 4:
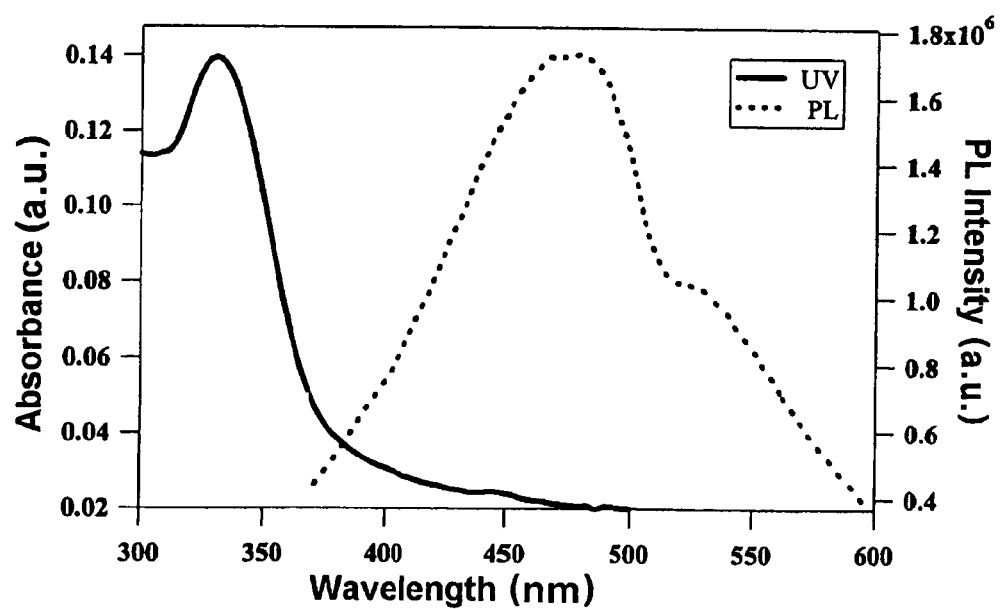
FIG. 4 shows UV-Vis and PL spectra of the polymer P-10 of Example 41.

FIGS. 1 and 3 show $^1$H NMR spectra of the monomer [M-29] prepared in Example 29 and of the polymer [P-10] prepared in Example 41. FIG. 2 shows ultraviolet-visible (UV-Vis) and PL spectra of the monomer [M-29] prepared in Example 29. FIG. 4 shows UV-Vis and PL spectra of the polymer [P-10] prepared in Example 41.

The PL spectra were measured as follows:

0.1 g of the polymer [P-10] was dissolved in 5 ml of chloroform, and the resulting solution was filtered through a micro-filter of 0.2 micron in size and then subjected to a spin coating while the spinning speed was controlled (generally in the range of 900–1200 rpm) to generate a polymer thin film such that the obtained polymer thin film has a thickness of 100 nm. After the obtained thin film was dried at room temperature, the UV-Vis spectrum was observed first, and then PL spectrum was observed at the wavelength where the UV-Vis spectrum was maximum. The results are shown in FIG. 4.

An EL element comprising ITO/light-emitting layer/electrode was constructed, and its EL properties were examined.

As light emitting layers, the polymers prepared in the Examples as described above, or their blends with generally used polymer such as polyvinylcarbazole, polymethylmethacrylate, polystyrene or epoxy resin in chloroform were used. Aluminum was used as an electrode.

Figure 5:
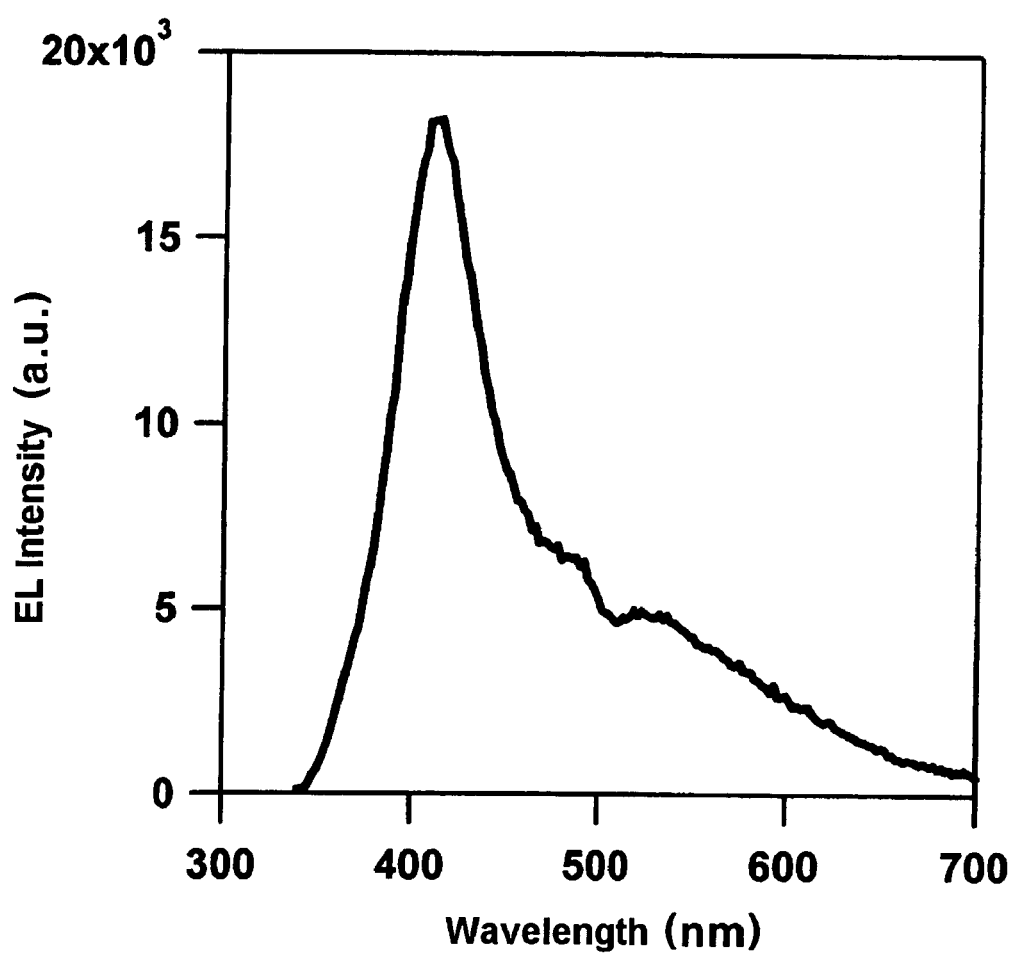
FIG. 5 shows an EL spectrum of the polymer P-10 of Example 41 which is blended with polyvinylcarbazole (polyvinylcarbazole: P-10=8:2)

The EL element was fabricated by a vacuum deposition in the same manner as in preparing the sample for observing UV-Vis or PL spectra, comprising a coating aluminum onto the light-emitting layer that was spin-coated onto the ITO substrate in the thickness of 100 nm. As a representative, FIG. 5 shows EL spectrum of the blend of the polymer [P-10] with polyvinylcarbazole.

The following table 1A to 1D show structures of the arylene-based monomers and polymers thereof, which may be included in the scope of the present invention, and light-emitting properties thereof.

TABLE 1A

| 번호 | 구조 | UV (CHCl$_3$) 최대(nm) | PL (CHCl$_3$) 최대(nm) | M.P. (° C.) |
|---|---|---|---|---|
| [M-1] | Br—⟨fluorene⟩—Br | — | — | 165–166 |
| [M-2] | Br—⟨fluorenone⟩—Br | — | — | 203–204 |

TABLE 1A-continued

| 번호 | 구조 | UV (CHCl₃) 최대(nm) | PL (CHCl₃) 최대(nm) | M.P. (° C.) |
|---|---|---|---|---|
| [M-3] | | — | — | 298–299 |
| [M-4] | | — | — | 202–204 |
| [M-5] | | — | — | 195–197 |
| [M-6] | | — | — | 160–162 |
| [M-7] | | — | — | — |
| [M-8] | | — | — | 243–244 |

TABLE 1A-continued
| 번호 | 구조 | UV (CHCl₃) 최대(nm) | PL (CHCl₃) 최대(nm) | M.P. (° C.) |
|---|---|---|---|---|
| [M-9] | 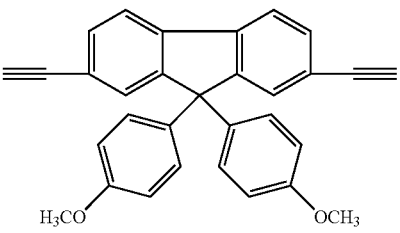 | — | — | 236–238 |
| [M-10] | 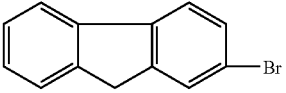 | — | — | 102–103 |
| [M-11] | 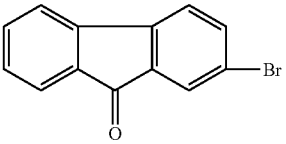 | — | — | 124–126 |
| [M-12] | 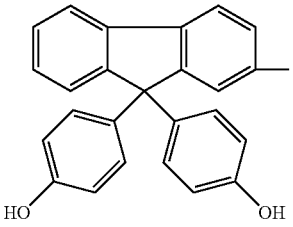 | — | — | 250–252 |
TABLE 1B
| 번호 | 구조 | UV (CHCl₃) 최대(nm) | PL (CHCl₃) 최대(nm) | M.P. (° C.) |
|---|---|---|---|---|
| [M-13] | 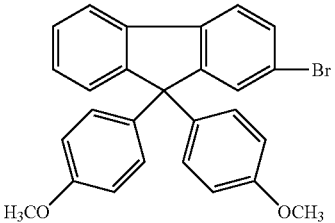 | — | — | 75–77 |
| [M-14] | 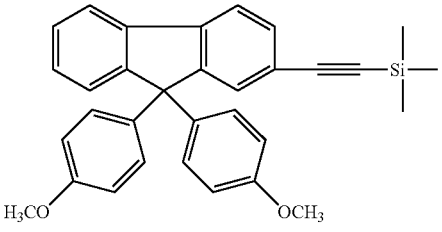 | — | — | 104–106 |

TABLE 1B-continued
| 번호 | 구조 | UV (CHCl₃) 최대(nm) | PL (CHCl₃) 최대(nm) | M.P. (° C.) |
|---|---|---|---|---|
| [M-15] | 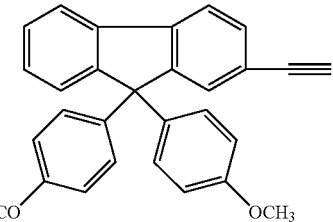 | — | — | — |
| [M-16] | 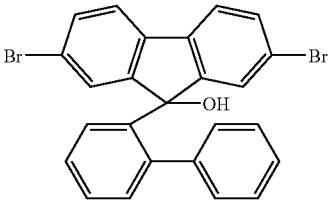 | — | — | 213–215 |
| [M-17] | 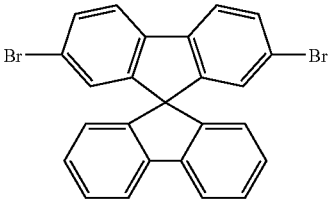 | — | — | 340–341 |
| [M-18] | 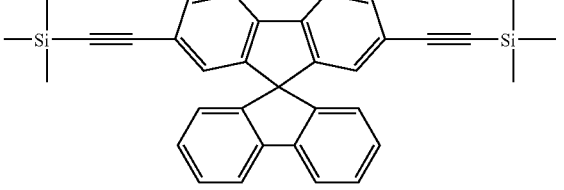 | — | — | 267–269 |
| [M-19] | 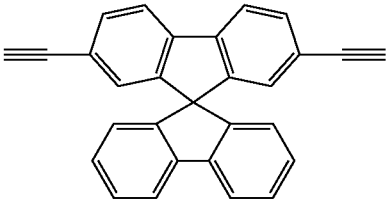 | — | — | — |
| [M-20] | 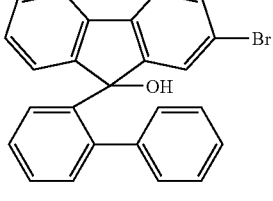 | — | — | 167–168 |
| [M-21] | 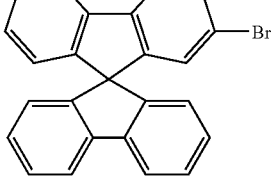 | — | — | 186–188 |

TABLE 1B-continued

| 번호 | 구조 | UV (CHCl₃) 최대(nm) | PL (CHCl₃) 최대(nm) | M.P. (° C.) |
|---|---|---|---|---|
| [M-22] | | — | — | 205–206 |
| [M-23] | | — | — | — |
| [M-24] | | — | — | 212–213 |

TABLE 1C

| 번호 | 구조 | UV (CHCl₃) 최대 (nm) | PL (CHCl₃) 최대 (nm) | M.P. (° C.) |
|---|---|---|---|---|
| [M-25] | | — | — | 207–208 |
| [M-26] | | — | — | — |
| [M-27] | | — | — | 172–174 |
| [M-28] | | — | — | 209–211 |

TABLE 1C-continued

| 번호 | 구조 | UV (CHCl$_3$) 최대 (nm) | PL (CHCl$_3$) 최대 (nm) | M.P. (° C.) |
|---|---|---|---|---|
| [M-29] | | — | — | 318–321 |
| [M-30] | | — | — | 164–165 |
| [M-31] | | — | — | 157–158 |
| [P-1] | | 334 | 386 | — |
| [P-2] | | 328 | 490 | — |

TABLE 1C-continued

| 번호 | 구조 | UV (CHCl₃) 최대 (nm) | PL (CHCl₃) 최대 (nm) | M.P. (° C.) |
|---|---|---|---|---|
| [P-3] | | 332 | 421 | — |
| [P-4] | | 332 | 398 | — |

TABLE 1D

| 번호 | 구조 | UV (CHCl₃) 최대 (nm) | PL (CHCl₃) 최대 (nm) | M.P. (° C.) |
|---|---|---|---|---|
| [P-5] | | 332 | 403 | — |

TABLE 1D-continued

| 번호 | 구조 | UV (CHCl₃) 최대 (nm) | PL (CHCl₃) 최대 (nm) | M.P. (° C.) |
|---|---|---|---|---|
| [P-6] | | 334 | 403 | — |
| [P-7] | | 328 | 492 | — |
| [P-8] | | 322 | 490 | — |

TABLE 1D-continued

| 번호 | 구조 | UV (CHCl₃) 최대 (nm) | PL (CHCl₃) 최대 (nm) | M.P. (° C.) |
|---|---|---|---|---|
| [P-9] | | 324 | 490 | — |
| [P-10] | | 339 | 404 | — |
| [P-11] | | 334 | 408 | — |
| [P-12] | | 330 | 398 | — |

TABLE 1D-continued

| 번호 | 구조 | UV (CHCl₃) 최대 (nm) | PL (CHCl₃) 최대 (nm) | M.P. (° C.) |
|---|---|---|---|---|
| [P-13] | 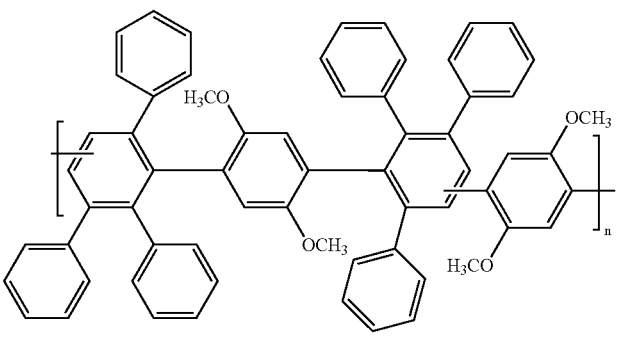 | 330 | 404 | — |

According to the present invention, a polyarylene compound, polymers thereof and an EL element using the same are disclosed. The polyarylene compounds and polymers thereof according to the present invention can be applied to light emitting diode (LED), which is an EL element. Additionally, the compounds and the polymers thereof have photo-, electrical- and magnetic properties so that can exhibit PL properties, nonlinear optical properties and photo- and electrical conductivities, and therefore, they can be applied to an optical switch, a sensor, a module, a waveguide, a material for light storage or amplification, a nonlinear optical material, a transistor, a laser, an optical conductor, an optical absorbent, a material for optical refraction, a polymer separating film, a piezoelectric- or magnetic material, a dielectric material, etc.

As the present invention may be embodied in several forms without departing from the spirit or essential properties thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An arylene-based polymer represented by the following formula:

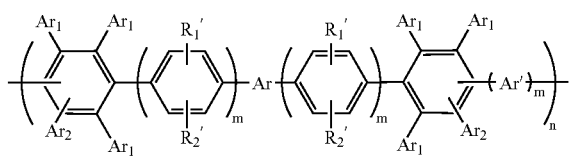

wherein $R_1'$ and $R_2'$ are the same with or different from each other and selected from the group consisting of hydrogen, $C_1$–$C_{22}$ aliphatic alkyl, cycloalkyl or alkoxy group, $C_6$–$C_{18}$ aryl or aryloxy group, an alkyl or aryl derivative of silicon, tin or germanium, and a halogen atom;

$Ar_1$ and $Ar_2$ are the same with or different from each other and are respectively selected from the group consisting of trimethylsilyl, bromine, an alkyl group, and an aromatic group having 6 to 18 carbon atoms;

Ar and Ar' respectively represent an arylene group selected from the group consisting of phenylene, naphthalene, anthracene, fluorene, thiophene, pyrrole, pynidine, aryloxadiazole, triazole, carbazole, arylamine, arylsilane and derivatives thereof;

m is 0 or 1; and n is 1.

2. The compound according to claim 1, wherein $R_1'$ and $R_2'$ are respectively selected from the group consisting of hydrogen, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, dococyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphthyl, anthrancenyle and derivatives thereof, trimethylsilyl, triphenylsilyl, tributyltin, triethylgermanium, iodide, bromide and chloride.

3. An arylene-based polymer represented by the following formula:

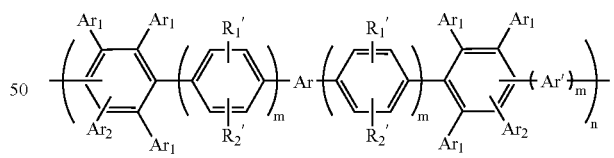

wherein $R_1'$ and $R_2'$ are the same with or different from each other and selected from the group consisting of hydrogen, $C_1$–$C_{22}$ aliphatic alkyl, cycloalkyl or alkoxy group, $C_6$–$C_{18}$ aryl or aryloxy group, an alkyl or aryl derivative of silicon, tin or germanium, and a halogen atom;

$Ar_1$ and $Ar_2$ are the same with or different from each other and are respectively selected from the group consisting of trimethylsilyl, bromine, an alkyl group, and an aromatic group having 6 to 18 carbon atoms;

Ar and Ar' respectively represent an arylene group selected from the group consisting of phenylene, naphthalene, anthracene, fluorene, thiophene, pyrrole, pyridine, aryloxadiazole, triazole, carbazole, arylamine, arylsilane and derivatives thereof;

m represents 0 or an integer of above 1; and n represents an integer of above 1.

4. The polymer according to claim 3, wherein $R_1'$ and $R_2'$ are respectively selected from the group consisting of hydrogen, methyl, ethyl, propyl, isopropyl, butyl, isobutyl, pentyl, hexyl, ethylhexyl, heptyl, octyl, isooctyl, nonyl, decyl, dodecyl, hexadecyl, octadecyl, dococyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphthyl, anthrancenyle and derivatives thereof, tnimethylsilyl, triphenylsilyl, tributyltin, triethylgermanium, iodide, bromide and chloride.

5. The polymer according to claim 3, wherein n is an integer from 2 to 1000.

6. The polymer according to claim 3, wherein Ar and Ar' are selected from arylene groups having the following structures:

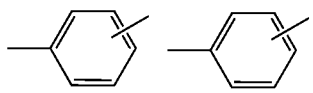
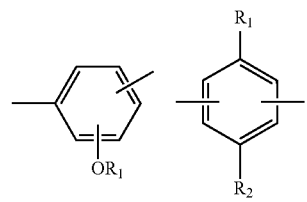
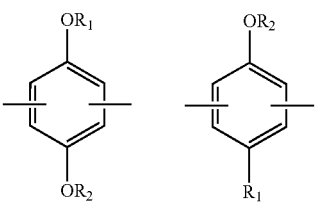
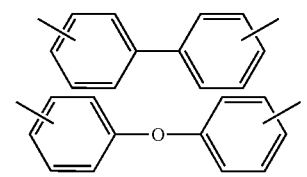
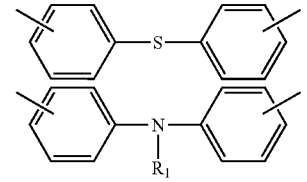
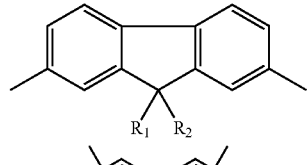
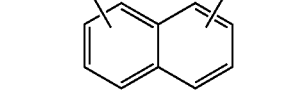

-continued

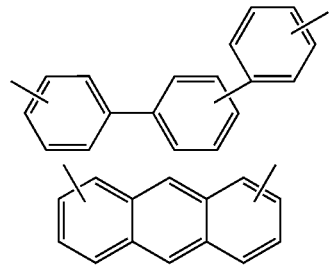
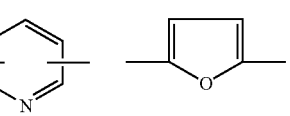
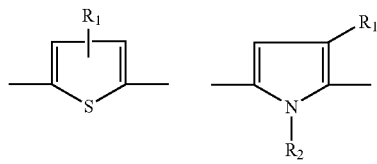
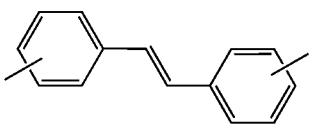
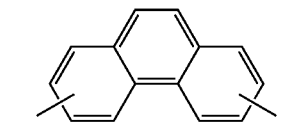
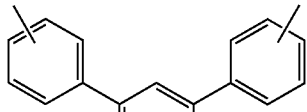
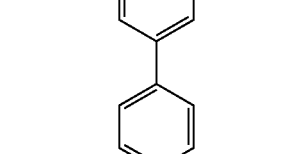
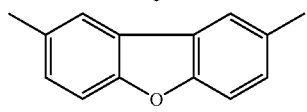
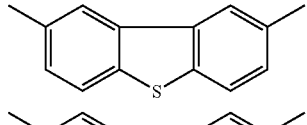
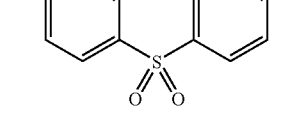
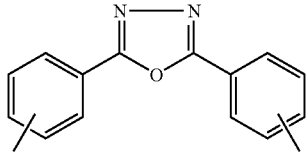

-continued

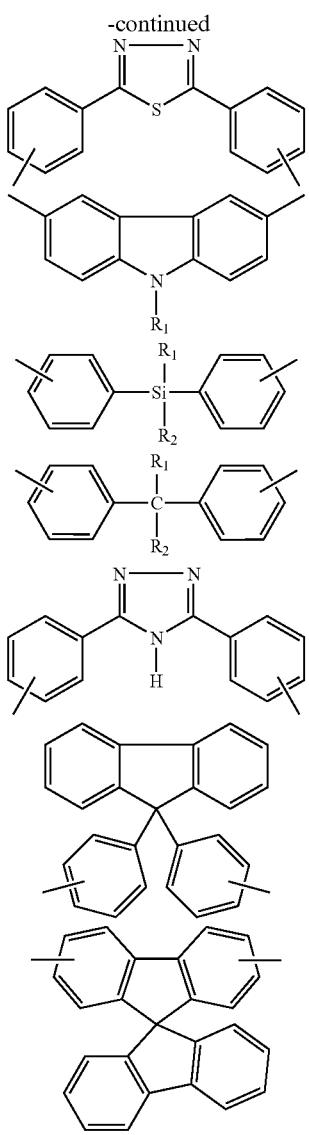

wherein $R_1$ and $R_2$ are the same with or different from each other and selected from the group consisting of hydrogen, $C_1$–$C_{22}$ aliphatic alkyl, cycloalkyl or alkoxy group, $C_6$–$C_8$ aryl or aryloxy group, an alkyl or aryl derivative of silicon, tin or germanium, and a halogen atom.

7. The polymer according to claim 3, which is a homopolymer having the same repeat units or a copolymer having different repeat units.

8. An arylene-based polymer according to claim 3 disposed in an electro-luminescence element as a light-emitting layer.

9. The polymer according to claim 8, wherein the electro-luminescence element comprises anode/light emitting layer/cathode, anode/hole transport layer/light-emitting layer/electron transport layer/cathode, or anode/hole injection layer/hole transport layer/light-emitting layer/electron transport layer/electron injection layer/cathode.

10. The polymer according to claim 9, wherein the light-emitting layer is the arylene-based polymer is cross-linked and is disposed as the light-emitting layer.

11. The polymer according to claim 3, wherein the light-emitting layer is a blend of the arylene-based polymer with a thermoplastic selected from the group consisting of polyvinylcarbozole, poly(1,4-hexyloxy-2,5-phenylenevinylene), poly(3-hexylthiopene), polymethylmethacrylate, polyacrylate, polystyrene, polycarbonate, polyvinylchloride, polyethylene, polypropylene, polyacrylronitrile, polyvinylpyrrolidone, polyvinylalcohol, polyvinylacetate, polyvinylbutyral, polyvinylamine, polycaprolactone, polyethyleneterephthalate, polybutyleneterephthalate, polyurethane, ABS, polysulfone and polyvinyifluoride, or a resin selected from the group consisting of acetal, polyamide, polyimide, polyester, alkide, urea, furan, nylon, melamine, phenol, silicone and epoxy.

12. An arylene material represented by the following formula:

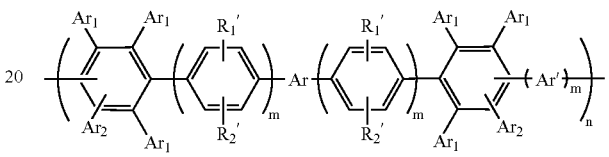

wherein $R_1'$ and $R_2'$ are the same with or different from each other and selected from the group consisting of hydrogen, $C_1$–$C_{22}$ aliphatic alkyl, cycloalkyl or alkoxy group, $C_6$–$C_{18}$ aryl or aryloxy group, an alkyl or aryl derivative of silicon, tin or germanium, and a halogen atom;

$Ar_1$ and $Ar_2$ are the same with or different from each other and are respectively selected from the group consisting of trimethylsilyl, bromine, an alkyl group, and an aromatic group having 6 to 18 carbon atoms;

Ar and Ar' respectively represent an arylene group selected from the group consisting of phenylene, naphthalene, anthracene, fluorene, thiophene, pyrrole, pyridine, aryloxadiazole, triazole, carbazole, arylamine, arylsilane and derivatives thereof;

m is 0 or 1; and n is at least 1.

13. The material according to claim 12, wherein Ar and Ar' are selected from arylene groups having the following structures:

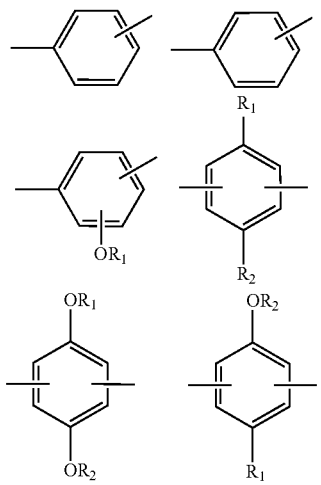

-continued
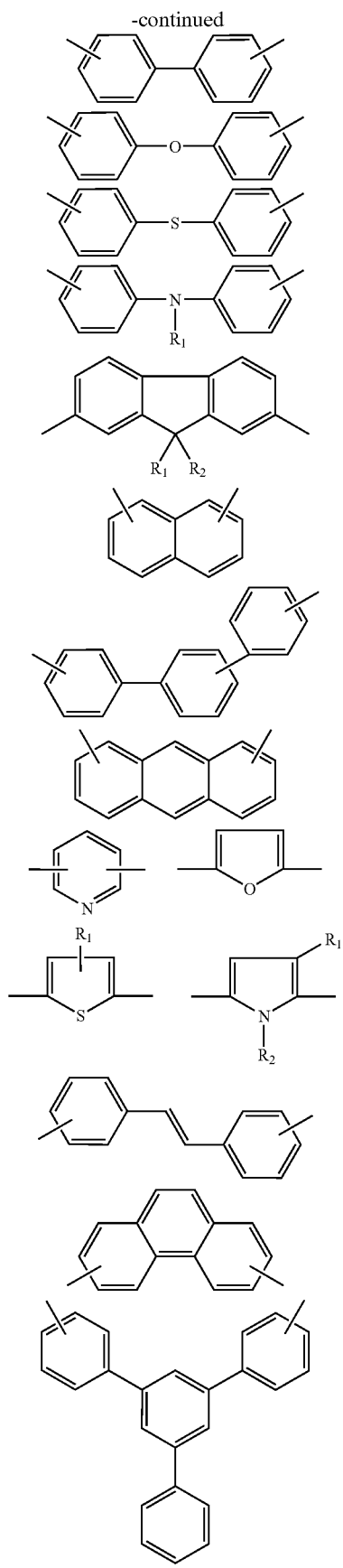
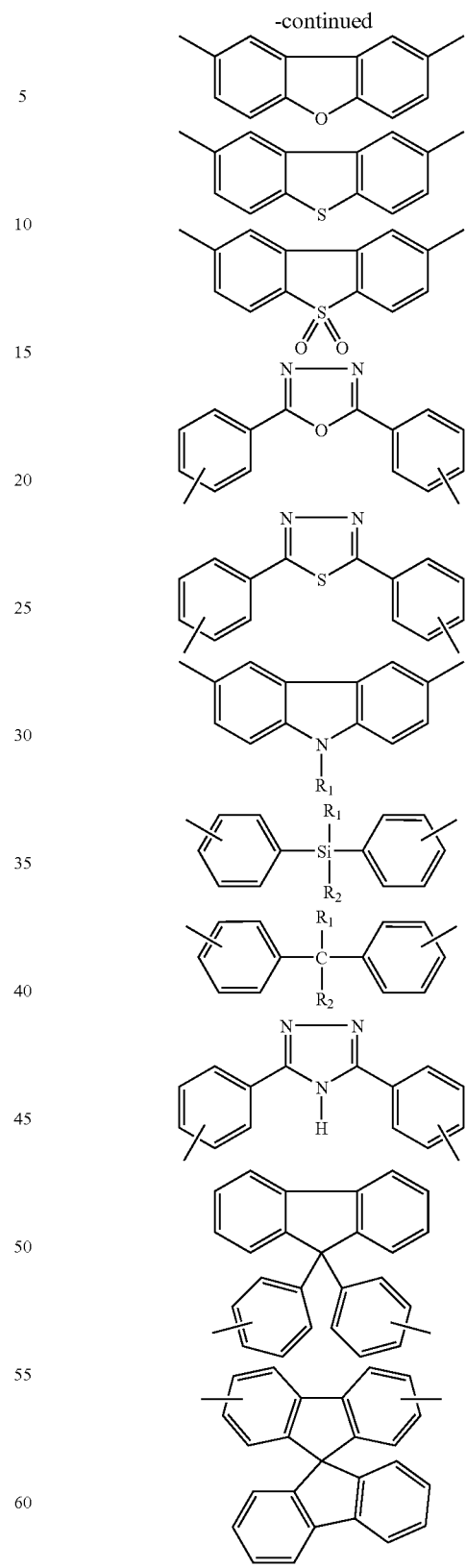
wherein $R_1$ and $R_2$ are the same with or different from each other and selected from the group consisting of hydrogen, $C_1$–$C_{22}$ aliphatic alkyl, cycloalkyl or alkoxy group, $C_6$–$C_{18}$ aryl or aryloxy group, an alkyl or aryl derivative of silicon, tin or germanium, and a halogen atom.

14. The material according to claim 13, wherein $R_1$, $R_2$, $R_1'$ and $R_2'$ are respectively selected from the group consisting of hydrogen, methyl, ethyl, propyl, isopropyl, butyl, isobutyl, pentyl, hexyl, ethyihexyl, heptyl, octyl, isooctyl, nonyl, decyl, dodecyl, hexadecyl, octadecyl, dococyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphthyl, anthrancenyle and derivatives thereof, trimethylsilyl, triphenylsilyl, tributyltin, triethylgermanium, iodide, bromide and chloride.

15. The material according to claim 12, wherein $R_1$, $R_2$, $R_1'$ and $R_2'$ are respectively selected from the group consisting of hydrogen, methyl, ethyl, propyl, isopropyl, butyl, isobutyl, pentyl, hexyl, ethyihexyl, heptyl, octyl, isooctyl, nonyl, decyl, dodecyl, hexadecyl, octadecyl, dococyl, cyclopropyl, cyclopentyl, cyclohexyl, methoxy, ethoxy, buthoxy, hexyloxy, methoxyethoxyethyl, methoxyethoxyethoxyethyl, cyanoethyl, carboxymethyl, phenyl, phenoxy, tolyl, benzyl, naphthyl, anthrancenyle and derivatives thereof, trimethylsilyl, triphenylsilyl, tributyltin, triethylgermanium, iodide, bromide and chloride.

* * * * *